US008190951B2

(12) United States Patent
Gille

(10) Patent No.: US 8,190,951 B2
(45) Date of Patent: May 29, 2012

(54) HANDLING OF ERRORS IN A DATA PROCESSING APPARATUS HAVING A CACHE STORAGE AND A REPLICATED ADDRESS STORAGE

(75) Inventor: Damien Rene Gilbert Gille, Juan-les-Pins (FR)

(73) Assignee: ARM Limited, Cambridge (GB)

( * ) Notice: Subject to any disclaimer, the term of this patent is extended or adjusted under 35 U.S.C. 154(b) by 399 days.

(21) Appl. No.: 12/461,693

(22) Filed: Aug. 20, 2009

(65) Prior Publication Data

US 2011/0047411 A1 Feb. 24, 2011

(51) Int. Cl.
*G11C 29/00* (2006.01)
*G06F 11/00* (2006.01)

(52) U.S. Cl. ........ 714/723; 714/710; 714/718; 714/746; 714/764; 714/6.32; 711/118; 711/119; 711/123

(58) Field of Classification Search .................. 714/723, 714/6.32, 710, 718, 746, 764; 711/118, 119, 711/123
See application file for complete search history.

(56) References Cited

U.S. PATENT DOCUMENTS

| | | | | |
|---|---|---|---|---|
| 5,835,504 A | * | 11/1998 | Balkin et al. .................. 714/723 |
| 5,841,961 A | * | 11/1998 | Kozaru et al. ................. 714/5.11 |
| 6,014,756 A | | 1/2000 | Dottling et al. | |
| 6,161,208 A | * | 12/2000 | Dutton et al. ................. 714/764 |
| 6,539,503 B1 | * | 3/2003 | Walker .......................... 714/703 |
| 6,587,922 B2 | * | 7/2003 | Higuchi et al. ............... 711/121 |
| 7,987,407 B2 | * | 7/2011 | Gille et al. .................... 714/764 |
| 2003/0110411 A1 | * | 6/2003 | Harari et al. ....................... 714/8 |
| 2008/0109691 A1 | * | 5/2008 | Dieffenderfer et al. ........ 714/733 |
| 2009/0164727 A1 | * | 6/2009 | Penton et al. ................. 711/118 |
| 2009/0164870 A1 | * | 6/2009 | Penton et al. ................. 714/764 |
| 2010/0064205 A1 | * | 3/2010 | Moyer .......................... 714/800 |
| 2010/0185897 A1 | * | 7/2010 | Abts et al. ...................... 714/16 |
| 2011/0047437 A1 | * | 2/2011 | Flynn ............................ 714/758 |

OTHER PUBLICATIONS

Constantinescu, C., "Impact of Deep Submicron Technology on Dependability of VLSI Circuits", IEEE, (2002), 5 pages.
McPherson, J.W. et al., "Reliability Challenges or 45 nm and Beyond", DAC, vol. 12.1, (2006), pp. 176-181).

* cited by examiner

*Primary Examiner* — John J Tabone, Jr.
(74) *Attorney, Agent, or Firm* — Nixon & Vanderhye P.C.

(57) ABSTRACT

A data processing apparatus includes processing circuitry, a cache storage, and a replicated address storage having a plurality of entries. On detecting a cache record error, a record of a cache location avoid storage is allocated to store a cache record identifier for the accessed cache record. On detection of an entry error, use of the address indication currently stored in that accessed entry of the replicated address storage is prevented, and a command is issued to the cache location avoid storage. In response, a record of the cache location avoid storage is allocated to store the cache record identifier for the cache record of the cache storage associated with the accessed entry of the replicated address storage. Any cache record whose cache record identifier is stored in the cache location avoid storage is logically excluded from the plurality of cache records.

30 Claims, 8 Drawing Sheets

CLAC FOR CACHE

| INDEX | WAY | ERROR LOCATION (TAG OR DATA) | INTERNAL (I) BIT | STATUS BITS |
|---|---|---|---|---|
| | | | | |
| | | | | |
| | | | | |

CLAC FOR REPLICATED ADDRESS STORAGE

| INDEX | CPU3 WAY(S) | CPU2 WAY(S) | CPU1 WAY(S) | CPU0 WAY(S) | STATUS BITS |
|---|---|---|---|---|---|
| | | | | | |
| | | | | | |
| | | | | | |

HANDLING OF ERRORS IN A DATA PROCESSING APPARATUS HAVING A CACHE STORAGE AND A REPLICATED ADDRESS STORAGE

BACKGROUND OF THE INVENTION

1. Field of the Invention

The present invention relates to techniques for handling errors in a data processing apparatus having a cache storage and a replicated address storage.

2. Description of the Prior Art

There are many applications for data processing systems where fault tolerance is an important issue. One such application is in safety critical systems, for example automotive systems that control air bags, braking systems, etc. One particular area of fault tolerance is tolerance to errors that can occur in the data stored within the data processing system. A typical data processing apparatus may include one or more storage devices used to store data values used by the data processing apparatus. As used herein, the term "data value" will be used to refer to both instructions executed by a processing device of the data processing apparatus, and the data created and used during execution of those instructions.

The storage devices within the data processing apparatus are vulnerable to errors. These errors may be soft errors, as for example may be caused by neutron strikes, where the state of data held in the storage device can be changed, but the storage device will still write and read data correctly. Such soft errors are also referred to as transient faults. Alternatively, the errors may be hard errors, as for example caused by electro-migration, in which the affected memory location(s) within the storage device will always store an incorrect data value, and the error cannot be corrected by re-writing the data value to the storage device location(s). Such hard errors are also referred to as permanent faults. Both soft errors and hard errors can often be corrected using known error correction techniques, so that the correct data value can be provided to the requesting device, for example a processor core. However, for the example of a hard error, if the corrected data value is then written back to the same memory location, it will again be stored incorrectly at that memory location, since the hard error stems from a fault in the storage device itself.

As well as permanent faults and transient faults, another type of error which can occur is an intermittent fault, such a fault for example being caused by certain environmental conditions in which the storage device operates. Whilst those fault triggering environmental conditions are present, the intermittent fault appears as a hard error, but the fault disappears when the environmental conditions change to be more favourable.

As process geometries shrink, and accordingly the storage devices become smaller and smaller, those storage devices become increasingly vulnerable to errors, and hence it is becoming increasingly important in fault tolerant systems to provide robust techniques for detecting such errors. For example, the articles "Impact of Deep Submicron Technology on Dependability of VLSI Circuits" by C Constantinescu, 0-7695-1597-5/02/$1700 (C) 2002 IEEE, and "Reliability Challenges for 45 nm and Beyond" by J W McPherson, DAC 2006, Jul. 24-28, 2006, San Francisco, Calif., USA, identify that reduced process geometries give rise to higher occurrences of faults, especially transient and intermittent faults.

Often, hard error faults occur due to manufacturing defects. Accordingly, it is known to perform certain hard error detection techniques at production time in order to seek to identify such hard errors. Further, to assist in the detection and handling of errors occurring post production, it is known to store error correction code (ECC) data or the like (generally referred to as error data herein) which can be stored in association with the data values, for reference when seeking to detect any errors in those stored data values.

One known error correction technique which makes use of such error data applies an error correction operation to data values when they are read out from the storage device, and before the data values are supplied to the requesting device. If an error is detected, the process aims to correct the data value using the associated error data and then supplies the corrected data to the requesting device. However, typically the corrected data is not written back to the storage device itself, nor is any attempt made to determine whether the error was a soft error or a hard error.

Whilst such an "in-line" correction technique can handle both hard and soft errors provided they are correctable (i.e. provided sufficient redundant information is available to be able to calculate what the true data value is), it suffers from a number of disadvantages. Firstly, additional logic is required on the read path, and this can adversely affect the timing of the read operation, and also adversely affects power consumption. Such an approach may also require control logic to stall the device performing the read operation (for example a processor pipeline). Additionally, because the data in the storage device is not corrected, there is a possibility that further errors could occur, and that the accumulating errors may change over time from being correctable to uncorrectable, or even undetectable. To seek to address this issue, some data processing systems provide an error "scrubber" mechanism that is used to periodically test and correct the data stored in the storage device. However, this mechanism requires time, and consumes energy.

As an alternative to such an in-line mechanism as described above, an alternative mechanism that could be attempted would be to detect and correct the data value when it is read, to store the corrected data value back to the memory device, and then to retry the read operation (referred to herein as a correct and retry mechanism). In the case of a soft error, this has the effect of correcting the data in the storage device, and hence when the read operation is retried, the correct data is read. However, if the error is a hard error, then the error will re-occur when the read is retried, and the operation will hence enter a loop where the data value is corrected, but continues to be wrong when re-read from the storage device. In this situation there is the potential for the system to "spin-lock", trapped in a loop of accessing, attempting correction and retrying, unless mechanisms are in place to spot such a behaviour and break out of the loop.

Whilst the above issues are generally applicable to any type of storage device provided within the data processing apparatus, further specific issues can arise if the storage device in question is a cache. One or more caches are often provided within a data processing apparatus to temporarily store data values required by a processing unit of the data processing apparatus so as to allow quick access to any such cached data values. As is known in the art, the cache will typically consist of a plurality of cache lines, and for each cache line storing valid data, an address identifier is provided within the cache identifying an address portion which is shared with all of the data values in that cache line. When an access request is issued specifying a memory address associated with a cacheable region of memory, a lookup procedure will be performed in the cache to seek to identify whether a portion of the memory address specified in the access request matches an address identifier in the cache, and if it does the access may proceed directly in the cache without the need to access the memory.

If a write through (WT) mode of operation is used for the cache lines, then any write updates made to the cache line contents will be replicated in memory so as to maintain consistency between the cache contents and the memory contents. However, if a write back (WB) mode of operation is employed, then any updates made to the contents of a cache line are not immediately replicated in the corresponding locations in memory. Instead, only when a cache line is later evicted, is the relevant data in memory brought up to date with the contents in the cache line (the need to do this is typically indicated by a dirty bit value, which is set if the cache line contents are written to whilst stored in the cache).

Considering the issue of hard or soft errors occurring in a cache, then as with other storage devices error correction code data can be stored in association with the cache contents with the aim of enabling errors to be detected.

If the cache can be arranged as a write through cache, then there are two possible approaches that can be taken on detection of an error in a particular cache line. In accordance with a first technique (which will be referred to herein as an "assume miss and invalidate" approach), the access can simply be considered to have missed in the cache. The data will then be retrieved from a lower level in the memory hierarchy. At the same time, in order to prevent errors accumulating in the cache, the cache line is invalidated. The data retrieved may typically be streamed into the device requesting the data, for example the processor core, but often will be reallocated into the cache. If the original error occurred as the result of a hard error, and the refetched data from memory is allocated into the same cache line, then the next time the data is accessed in the cache, the same error is likely to be detected again. This will potentially cause significant performance degradation.

In accordance with a second, alternative, technique for a write through cache (referred to as an "invalidate and retry" mechanism), on detection of an error in a particular cache line, that cache line can merely be invalidated and the access retried without the need to seek to perform any correction on the data held in the cache line. When the access is retried, a miss will occur in the cache, and the data will be retrieved from a lower level in the memory hierarchy. As with the first technique, this retrieved data may typically be streamed into the device requesting the data, for example the processor core, but often will be reallocated into the cache, so that a cache hit will occur on the next access. If the original error occurred as the result of a hard error then, when the access is retried, the same error is likely to be detected again. The processor will get stuck in a spinlock, continually retrying the access and detecting the error.

The problems become even more complex if the cache is at least partially a write back cache, since if an error is detected in a cache line using such a write back mechanism, then it is not merely sufficient to invalidate the cache line, but instead the cache line contents must first be corrected and then evicted to memory. Accordingly the "assume miss and invalidate" approach that can be applied to a write through cache cannot be used for a write back cache, because the cache line with the error in it may be valid and dirty, and hence if the first technique were used the dirty data would be lost. The "invalidate and retry" approach can be used, but as part of the invalidate operation the cache line will need to be corrected (i.e. a correct and retry style operation is needed). This applies not only to the data values in the cache line itself, but also to the associated address identifier, and associated control data such as the valid bit indicating if the cache line is valid and the dirty bit indicating if the cache line is dirty, since all of these contents may potentially be subject to errors. Hence, by way of example, if the valid bit is itself corrupted by an error, the cache line that holds valid data may appear from the associated valid bit to not hold valid data. Accordingly, when adopting a write back mode of operation in a cache, it may be necessary to perform error detection and correction even on cache lines that on face value appear to be invalid.

With the above issues in mind, commonly owned co-pending U.S. patent application Ser. No. 12/004,476 (the entire contents of which are hereby incorporated by reference) describes a mechanism for handling errors occurring within a cache of a data processing apparatus, which can yield improved performance relative to the earlier-mentioned "in-line" correction mechanisms, and which can be used not only in association with write through caches but also write back caches. In accordance with the technique described therein, a cache location avoid storage having at least one record is provided within the data processing apparatus, with the cache location avoid storage being populated during normal use of the data processing apparatus. If an error condition is detected when accessing a cache line of the cache, then a record in the cache location avoid storage is allocated to store the cache line identifier for that cache line in which the error condition was detected. Further, a clean and invalidate operation is performed in respect of that cache line and the access is then re-performed. When performing lookup operations in the cache, the cache access circuitry excludes from that lookup procedure any cache line identified in the cache location avoid storage.

Through use of the technique described in U.S. application Ser. No. 12/004,476, it can be ensured that errors occurring in the cache storage do not cause incorrect operation when accesses are performed in respect of the cache storage, whilst allowing the advantages of an invalidate and retry/correct and retry mechanism to be retained, such as the fact that the error detection mechanism can be provided on a separate path to the normal data retrieval path (providing both power and timing benefits).

Another issue that can arise in systems employing caches is coherency. In particular it is known to provide a multi-processing system in which two or more processing devices, for example processor cores, share access to shared memory. Such systems are typically used to gain higher performance by arranging the different processor cores to execute respective data processing operations in parallel. To further improve speed of access to data within such a multi-processing system, it is known to provide one or more of the processing devices with its own local cache in which to store a subset of the data held in the shared memory. Whilst this can improve speed of access to data, it complicates the issue of data coherency. In particular, it will be appreciated that if a particular processor performs a write operation with regards to a data value held in its local cache, that data value will be updated locally within the cache, but may not necessarily also be updated at the same time in the shared memory. This is for example the case if the data value in question relates to a write back region of memory, in which case the updated data value in the cache will only be stored back to the shared memory when that data value is subsequently evicted from the cache.

Since the data may be shared with other processing devices, it is important to ensure that those processing devices will access the up-to-date data when seeking to access the associated address in shared memory. To ensure that this happens, it is known to employ a cache coherency protocol within the multi-processing system to ensure that if a particular processor updates a data value held in its local cache, that up-to-date data will be made available to any other processing device subsequently requesting access to that data.

In accordance with a typical cache coherency protocol, certain accesses performed by a processing device will require a coherency operation to be performed. The coherency operation will cause a notification to be sent to one or more of the other processing devices that have their own local caches, identifying the type of access taking place and the address being accessed. This will cause those other processing devices to perform certain actions defined by the cache coherency protocol. One such action is the invalidation of a cached data value, indicating that this data value has become out-of-date due to the actions of the other processing devices and should not be used. Such a cache coherency protocol may be administered by the provision of a snoop control unit (SCU) which monitors memory access requests issued by each of the processing devices and causes required actions to be taken by the processing devices.

To assist the SCU in determining which processing devices need be subjected to a coherency operation, it is known to provide a replicated address storage for access by the SCU, a replicated address storage being provided in association with each local cache of a processing device, each entry of the replicated address storage having a, predetermined associated cache record within the local cache and being arranged to replicate the address indication stored in that associated cache record. By reference to the relevant replicated address storage, the SCU can ascertain whether a processing device's local cache may be storing a copy of a data value which is the subject of an access by another processing device, and hence can determine whether a coherency operation needs to be invoked in relation to that local cache.

However, considering the earlier discussion of fault tolerance, and the handling of errors, it will appreciated that in such systems there are now two copies of the address information of the various cache records of each local cache, and errors can occur in either or both of these copies independently. In such systems, it is hence important that an error in one of the two copies is carefully handled so that the location giving rise to the error is not used again (which would face the system with potential multiple errors), and so that the SCU and a processing unit having a local cache always have the same coherent view of that cache.

U.S. Pat. No. 6,014,756 describes a high availability shared cache memory in a tightly coupled multi-processor system which provides an error self-recovery mechanism for errors in the shared cache. In particular, a shared cache is disclosed which is managed by means of a set associative cache directory. In case of an error in the shared cache, the relevant entry as well as its congruence class is invalidated in the cache directory and the requested data fetched from an upper memory before being reallocated in the local cache and the shared cache. Hard error support is provided by using periodic accesses to the cache error logging structure to check if errors occur often. In this case, a delete bit is set to prevent the corresponding entry from being used further.

The approach described in U.S. Pat. No. 6,014,756 is arranged for use in an inclusive cache system (where the contents of the level 1 cache are always stored in the level 2 cache), and if the errors are hard errors the approach described will not prevent those hard errors re-occurring until the delete bit mechanism is used.

It would be desirable to provide an efficient mechanism for handling errors occurring in a data processing apparatus having both a cache storage and a replicated address storage.

SUMMARY OF THE INVENTION

Viewed from a first aspect, the present invention provides a data processing apparatus, comprising: processing circuitry for performing data processing operations; a cache storage having a plurality of cache records for storing data values for access by the processing circuitry when performing said data processing operations, each cache record for storing one or more data values and an associated address indication for said one or more data values; a replicated address storage having a plurality of entries, each entry having a predetermined associated cache record within the cache storage and being arranged to replicate the address indication stored in said associated cache record; first error detection circuitry associated with said cache storage; a cache location avoid storage having at least one record, the cache location avoid storage being associated with the first error detection circuitry; responsive to a cache record of the cache storage being accessed, the first error detection circuitry being arranged to determine whether a cache record error exists for said accessed cache record; on detection of said cache record error, said cache location avoid storage being arranged to cause one of said at least one record to be allocated to store a cache record identifier for the accessed cache record; second error detection circuitry associated with said replicated address storage; responsive to an entry of the replicated address storage being accessed, the second error detection circuitry being arranged to determine whether an entry error exists for said accessed entry; on detection of said entry error, the second error detection circuitry preventing use of the address indication currently stored in the accessed entry, and issuing a command to said cache location avoid storage to cause one of said at least one record of said cache location avoid storage to be allocated to store the cache record identifier for the cache record of said cache storage associated with said accessed entry of the replicated address storage; and any cache record whose cache record identifier is stored in the cache location avoid storage being logically excluded from the plurality of cache records of the cache storage for the purposes of subsequent operation of the cache storage.

In accordance with the present invention, when a cache record of the cache storage is accessed, it is determined whether a cache record error exists for that accessed cache record, and if so a record in a cache location avoid storage is allocated to store a cache record identifier for the accessed cache record. Any cache record whose cache record identifier is stored in the cache location avoid storage is logically excluded from the plurality of cache records of the cache storage for the purposes of subsequent operation of the cache storage.

Further, when an entry of the replicated address storage is accessed, it is determined whether an entry error exists for that accessed entry, and if so use of the address indication currently stored in the accessed entry of the replicated address storage is prevented. In addition, a command is issued to the cache location avoid storage to cause a record within the cache location avoid storage to be allocated to store the cache record identifier for the cache record of the cache storage associated with the accessed entry of the replicated address storage.

Such an approach has been found to provide a particularly efficient mechanism for handling errors arising in data processing systems including both a cache storage and a replicated address storage. In particular, a cache location avoid storage provided in association with the cache storage is arranged to logically exclude from the plurality of cache records of the cache storage any cache record for which an error has directly been detected, and any cache record for which an error has been detected in the associated entry of the replicated address storage. With regard to the replicated address storage itself, it is merely then sufficient to prevent further use of the address indication stored in any accessed entry of the replicated address storage for which an error has been detected.

There are a number of ways in which a cache record whose cache record identifier is stored in the cache location avoid storage can be logically excluded from further use as part of the cache storage. In one embodiment, access to that cache record can physically be prevented, whilst in another embodiment the actual cache record may still be physically accessible but any information derived from access to that cache record will be blocked from being used.

It will be appreciated that various types of access to cache records of the cache storage take place during operation of the data processing apparatus. For example, a cache record may be accessed during the performance of a lookup operation initiated in response to an access request issued by the processing circuitry, may be accessed as part of a linefill operation when seeking to find a candidate cache line for eviction, or may be accessed to perform cache maintenance operations. However, once a cache record has its cache record identifier stored in the cache location avoid storage, and any correction operation initiated in response to detection of the error condition in respect of that cache record has been performed, then that cache record will be logically excluded from the cache storage for the purposes of all subsequent operations of the cache storage. Hence, from that point on, that cache record will be treated as hidden or masked. Thus, when a cache lookup operation is performed in respect of the cache, that cache record will not be involved in the cache lookup procedure. Similarly, when a linefill operation is performed in respect of the cache, that cache record will not be a candidate for the linefill operation.

From the above description, it will be seen that the present invention provides a hardware implementation that automatically identifies errors and removes cache records exhibiting such errors from the allocation pool of cache records making up the cache storage. It hence enables the benefits of the technique described in the earlier-mentioned commonly assigned co-pending U.S. patent application Ser. No. 12/004, 476 to be achieved within a data processing apparatus having not only the cache storage but also a replicated address storage, whilst handling in an efficient manner an error in either the cache storage itself or in the replicated address storage.

In one embodiment, the replicated address storage is constructed in the same way as the cache storage, and hence by way of example if the cache storage is an n-way set associative cache storage, the replicated address storage will also be an n-way set associative storage. In such embodiments, there will clearly be a one to one relationship between an entry in the replicated address storage and an associated cache record within the cache storage. However, it is not essential for the replicated address storage to be constructed identically to the cache storage, provided each entry of the replicated address storage has a predetermined associated cache record. Whilst in one embodiment there will be a one to one relationship between each entry and an associated cache record, in an alternative embodiment it will be possible for one entry to have more than one associated cache record. Conversely, a cache record can correspond to more than one entry.

There are a number of reasons why a data processing apparatus might provide a replicated address storage in addition to the cache storage. However, in one embodiment, the replicated address storage is used by cache coherency circuitry to maintain cache coherency. In particular, in one embodiment, the data processing apparatus further comprises at least one additional processing circuitry that does not have access to the cache storage; and cache coherency circuitry for performing a coherency operation to ensure a consistent view of said data values by both the processing circuitry and the at least one additional processing circuitry; and said replicated address storage being accessed by the cache coherency circuitry when performing said coherency operation.

The cache coherency circuitry may be embodied in a variety of ways. In one embodiment, the cache coherency circuitry may be provided at some central location for monitoring access requests issued by both the processing circuitry and the additional processing circuitry, and hence for example may be embodied by a snoop control unit to which both the processing circuitry and additional processing circuitry are coupled via a bus. In such embodiments, the replicated address storage will also typically be provided centrally, for example within such an SCU. However, in an alternative embodiment, the cache coherency circuitry can be distributed so that a separate cache coherency circuit is associated with at least each local cache within the data processing apparatus. In such embodiments, each separate cache coherency circuit may be arranged to snoop accesses occurring over a bus shared by the processing circuitry and the additional processing circuitry in order to determine when coherency operations are required. In such embodiments, the replicated address storage for each cache storage will typically be stored locally to that cache storage for access by the associated cache coherency circuit.

In one embodiment, said coherency operation is performed by said cache coherency circuitry in response to a request issued by the at least one additional processing circuitry and specifying an address of a data value that is cacheable by the cache storage, the replicated address storage being referenced to determine whether the address indication for that specified address has been cached in the cache structure.

Which address indications are replicated within the replicated address storage may be determined dependent on implementation. For example, in one embodiment, every address indication stored in the cache storage is replicated within the replicated address storage, whilst in another embodiment only a subset of those address indications are replicated. In one embodiment, each entry of the replicated address storage replicates the address indication stored in said associated cache record if the at least one data value stored in said associated cache record is allowed to be shared with said at least one additional processing circuitry.

On detection of the entry error by the second error detection circuitry, there are a number of ways in which the command can be issued from the second error detection circuitry to the cache location avoid storage. However, in one embodiment, the data processing apparatus further comprises: a coherency bus; and a coherency bus interface associated with the cache location avoid storage; the coherency bus interconnecting said cache coherency circuitry and said coherency bus interface; wherein the command issued by the second error detection circuitry on detection of said entry error is propagated from the cache coherency circuitry to the coherency bus interface via the coherency bus, from where the command is passed to the cache location avoid storage. Hence, in such embodiments, the command can be routed over the coherency bus, and in one particular embodiment can be arranged to have a format consistent with other commands issued over the coherency bus, thereby avoiding the need for any dedicated routing for handling the transfer of the command over the coherency bus.

In addition to passing the command to the cache location avoid storage, in one embodiment the command issued by the second error detecting circuitry is also passed to the cache storage to force an invalidation of the cache record of said cache storage associated with said accessed entry of the replicated address storage.

In one embodiment, receipt of said command by the cache storage further forces a clean operation to be performed in respect of the at least one data value stored in the cache record of said cache storage associated with said accessed entry of the replicated address storage, the clean operation being performed prior to the invalidation of the cache record. If the clean and invalidate operation is applied in respect of a cache line that uses a write back mechanism, and the dirty bit is set, then as part of the clean and invalidate operation it will also be necessary to correct the cache line contents if needed and evict them to a lower level of the memory hierarchy.

From the above discussion of embodiments of the present invention, it will be appreciated that records of the cache location avoid storage are allocated to store cache record identifiers not only when errors are detected in the cache records themselves, but also when errors are detected in the associated entries of the replicated address storage. In one embodiment, the cache location avoid storage is arranged to keep track of where the error occurred that caused any particular record of the cache location avoid storage to be allocated. More particularly, in one embodiment, each record of the cache location avoid storage has a source flag associated therewith, the cache location avoid storage being arranged, when allocating a record to store a cache record identifier, to set the associated source flag to a first value if the allocation is in response to the detection of said cache record error by the first error detection circuitry, and to set the associated source flag to a second value if the allocation is in response to receipt of said command from the second error detection circuitry.

It will be appreciated that over time it is possible that an error may be detected in both a cache record and in the associated entry of the replicated address storage. In one embodiment, in such situations, irrespective of where the error was first detected, for any cache record identifier stored in the cache location avoid storage, the associated source flag is set to the first value if both said cache record error has been detected by the first detection circuitry, and said entry error has been detected by the second error detection circuitry for the associated entry of the replicated address storage. Hence, the source flag can be seen in such embodiments to be "sticky" in one direction, in that once it has been set to the first value, it is then retained at the first value irrespective of whether an error is also detected in the associated entry of the replicated address storage. This ensures that if the error has at some point been detected in the actual cache record associated with the cache record identifier stored in a record of the cache location avoid storage, that fact is not subsequently lost by changing the source flag value to the second value if the error is also detected in the associated entry of the replicated address storage.

On detection of an entry error for an accessed entry of the replicated address storage, there are a number of ways in which the further use of the address indication currently stored in that accessed entry can be prevented. In one embodiment, on detection of said entry error, the second error detection circuitry is arranged to prevent use of the address indication currently stored in the accessed entry by applying an invalidate operation in respect of the accessed entry.

However, in an alternative embodiment, the data processing apparatus further comprises: a further cache location avoid storage having at least one record, said further cache location avoid storage being associated with the second error detection circuitry; on detection of said entry error, said further cache location avoid storage being arranged to cause one of said at least one record to be allocated to store an entry identifier for the accessed entry; and any entry of the replicated address storage whose entry identifier is stored in the further cache location avoid cache being logically excluded from the plurality of entries of the replicated address storage for the purposes of subsequent operation of the replicated address storage. Hence, in such embodiments, two cache location avoid storages are used, one associated with the cache storage itself, and a further cache location avoid storage then being associated with the replicated address storage.

In one embodiment, whilst the cache location avoid storage associated with the cache storage allocates records not only for errors detected in the cache records of the cache storage, but also for errors detected in the corresponding entries of the replicated address storage, the further cache location avoid storage associated with the replicated address storage only allocates records in respect of errors found in the entries of the replicated address storage. In particular, in one embodiment, on detection of said cache record error by said first error detection circuitry, said cache record error is not reported to said further cache location avoid storage. This has been found to significantly reduce the communication required on detection of errors whilst ensuring correct operation of the data processing apparatus.

For example, considering the earlier example embodiment where the replicated address storage is referenced by cache coherency circuitry, it can be seen that if an error is detected by the first error detection circuitry in respect of a cache record of the cache storage, a record will be allocated in the cache location avoid storage associated with that cache storage, but in accordance with the above embodiment no record will be allocated in the further cache location avoid storage and accordingly the corresponding entry of the replicated address storage will continue to be useable. However, when the cache coherency circuitry later references the replicated address storage to invoke a coherency operation, if a hit is detected for the replicated address indication, it will issue a coherency request to the cache storage. However, since the corresponding cache record has been logically excluded from the cache storage, the cache storage will return a signal to the cache coherency circuitry indicating that the requested line is not present, whereafter the cache coherency circuitry is merely required to obtain the requested data from the lower levels of the memory hierarchy in the standard manner. Accordingly, it can be seen that the decision not to report errors detected by the first error detection circuitry to the further cache location avoid storage in no way inhibits correct operation. Instead, the mechanism is safe by construction, and merely produces a slight degradation in performance for coherent read accesses to the cache line which has been logically excluded from the cache storage due to an error detected by the first error detection circuitry. However, there is a significant reduction in communication when a cache record error is detected, by avoiding the need to report that cache record error to the further cache location avoid storage.

The second error detection circuitry can be arranged to perform error detection for various types, of access to the replicated address storage. However, in one embodiment, responsive to an entry of the replicated address storage being subjected to a read access, the second error detection circuitry is arranged to determine whether an entry error exists for said accessed entry.

Whilst the cache storage may be a data cache, an instruction cache, or indeed a unified cache, in one embodiment the cache storage is a data cache, and the data values stored therein are data used by the processing circuitry when executing instructions.

The processing circuitry and at least one additional processing circuitry can take a variety of forms. In one embodiment, the processing circuitry may take the form of a processor, and the cache storage may comprise a local cache for that processor. In such embodiments, the at least one additional processing circuitry may be a processor, a direct memory access (DMA) unit, a data engine, etc. The at least one additional processing circuitry may or may not have its own local cache, and in the event that it also has a local cache then there will typically also be a further replicated address storage in respect of that local cache.

In one embodiment the cache storage is a level one cache tightly coupled to the processing circuitry, whilst in another embodiment the cache storage is a level two cache.

In one embodiment, the cache location avoid storage may have sufficient records, and the likelihood of errors occurring may be low enough, that it is expected that the cache location avoid storage will not become full. However, in one embodiment, the usage of the cache location avoid storage can be improved by providing analysis circuitry which can be triggered by some event (for example the cache location avoid storage becoming full, or a new record being allocated to the cache location avoid storage) to perform an analysis to determine whether the cache record error is a soft error or a hard error. In particular, in one embodiment, the data processing apparatus further comprises analysis circuitry for determining whether said cache record error is a soft error or a hard error, and for invalidating a cache record identifier stored in the cache location avoid storage if that cache record identifier was stored in the cache location avoid storage due to a soft error. As a result of the cache record identifier being invalidated, the associated cache record is no longer logically excluded from the plurality of cache records of the cache storage for the purposes of subsequent operation of the cache storage.

In embodiments where a further cache location avoid storage is provided in association with the replicated address storage, then the analysis circuitry can also be used to analyse the entry errors recorded in that further cache location avoid storage. In particular, in one embodiment, the data processing apparatus further comprises analysis circuitry for determining whether said entry error is a soft error or a hard error, and for causing an entry identifier stored in the further cache location avoid storage to be invalidated if that entry identifier was stored in the further cache location avoid storage due to a soft error. As a result of the entry identifier being invalidated, the associated entry in the replicated address storage is no longer logically excluded from the plurality of entries of the replicated address storage for the purposes of subsequent operation of the replicated address storage.

In one particular embodiment, each record of the cache location avoid storage has a source flag associated therewith, and the cache location avoid storage is arranged when allocating a record to store a cache record identifier to set the associated source flag to a first value if the allocation is in response to the detection of said cache record error by the first error detection circuitry, and to set the associated source flag to a second value if the allocation is in response to receipt of said command from the second error detection circuitry. If said analysis circuitry causes an invalidation of an entry identifier in the further cache location avoid storage, the analysis circuitry further causes an invalidate command to be issued to the cache location avoid storage. The cache location avoid storage is responsive to the invalidate command to invalidate the cache record identifier for the cache record of said cache storage associated with said entry of the replicated address storage whose entry identifier has been invalidated, provided that the associated source flag has said second value. Hence, only if the associated source flag has the second value will the relevant cache record identifier in the cache location avoid storage be invalidated. If instead the associated source flag has the first value, then the cache record identifier will not be invalidated, since it will then be known that a separate error has been detected in respect of the cache record itself, and hence the analysis performed in respect of the corresponding entry of the replicated address storage is not sufficient to cause the cache record identifier to be removed from the cache location avoid storage.

The error detection operations performed by the first and second error detection circuits can take a variety of forms. However, in one embodiment, the first and second error detection circuitry perform error checking and correcting operations. The error correcting operation can take a variety of forms. However, in one embodiment the correction operation comprises a clean and invalidate operation. If the correction operation is applied in respect of a cache line that uses a write back mechanism, and the dirty bit is set, then as part of the clean and invalidate operation it will also be necessary to correct the cache line contents and evict them to a lower level of the memory hierarchy.

In one embodiment, if on detection of said cache record error, no record in the cache location avoid storage is available to be allocated to store the cache record identifier for the accessed cache record, an event signal is generated to identify that the allocation to the cache location avoid storage failed. An alternative mechanism would be to employ some eviction mechanism to select an existing error record's contents to be discarded, in order to free up an error record for storage of a cache record identifier for the currently accessed cache record. However, by not forcibly pushing a cache record identifier into the cache location avoid storage when the cache location avoid storage is already full, this ensures that errors do not evict one another and hence avoids some deadlock/livelock situations from arising. In one embodiment, the issue of such an event signal may be used to trigger the analysis circuitry to analyse the current contents of the cache location avoid storage, in order to determine whether any cache record identifiers can be invalidated, thereby freeing up one or more records of the cache location avoid storage.

The cache storage can be constructed in a variety of ways. However, in one embodiment, the cache storage comprises data storage having a plurality of cache lines for storing data values, and address storage having a plurality of entries, each entry identifying for an associated cache line said address indication, and each cache record of the cache storage comprises an entry from the address storage and the associated cache line from the data storage. In one particular embodiment, the address storage is formed of one or more RAM structures referred to as tag RAMs, and the data storage is formed of one or more RAM structures referred to as data RAMs.

When an access to a particular cache record occurs, and an error is detected, that error may be either in the relevant entry in the address storage or in the associated cache line in the data storage. Indeed, in some instances a separate error may be present in both the entry in the address storage and the associated cache line in the data storage.

In one embodiment, the cache record identifier identifies whether the cache record error has been detected in the entry from the address storage or the associated cache line from the data storage. In one particular embodiment, if an error is detected in both the address storage and the data storage for a particular cache record, then two separate error records are populated in the cache record error storage. However, in an alternative embodiment, an error in both the address storage and the data storage for a particular cache record can be indicated within a single record of the cache location avoid storage.

The cache storage can take a variety of forms. In one embodiment, the cache storage is an n way set associative cache, and an access performed in response to a request from the processing circuitry is performed in respect of a set in the cache having a cache record in each way of the cache storage. Said cache record identifier stored in the cache location avoid storage identifies the associated cache record by record in the specified set other than any cache record of the specified set identified in the cache location avoid storage. Hence, in such embodiments, the set and way identifiers are used to identify each cache record in the cache location avoid storage, and the error detection circuitry excludes any such identified cache record from the error detection procedures. Hence, it will be appreciated that in such embodiments any cache record identified in the cache location avoid storage is excluded from the error detection procedure performed by the first error detection circuitry, thereby reducing power consumption, and avoiding any further allocations into the cache location avoid storage in connection with that cache record. Another major benefit is the improved reliability of the system: locations with multiple errors detected thanks to the data pattern (for instance, a three stuck-at zero fault would be detected with an incoming data value of 001 but not detected with an incoming data value of 111 if the data is protected with a double-error-detection redundant code) are removed from the usage set. If not removed, the location could generate undetectable errors and then malfunctioning or non-correctable ones. Besides, such embodiments of the invention provide error containment because further errors on the same cache location will not impact the behaviour of the system.

The cache location avoid storage can be arranged in a variety of ways. In one embodiment, the cache location avoid storage is formed as a cache, and in one particular embodiment is formed as a fully associative cache where any cache record can be identified in any record of the cache location avoid storage. In an alternative embodiment, the cache location avoid storage may be a direct mapped cache, such that any particular cache record can only be identified in one particular record of the cache location avoid storage. Using a fully associative cache structure provides more flexibility than the direct mapped structure, but also is typically larger than a direct mapped cache structure assuming the same number of records, due to the additional comparators required in a fully associative cache structure. In another embodiment, the cache location avoid storage may be formed as a set associative cache. The fully-associative implementation will typically allow a better usage of the records of the cache location avoid storage.

In one embodiment, when a cache record in the cache storage needs to be selected as an allocated cache record for the storage of data values for access by the processing circuitry, any cache record whose cache record identifier is stored in the cache location avoid storage is excluded from selection as the allocated cache record. Hence, each cache record identified in the cache location avoid storage is excluded from linefill operations, and accordingly no data will be allocated into that cache record once it is identified in the cache location avoid storage.

Viewed from a second aspect, the present invention provides a cache apparatus, comprising: a cache storage having a plurality of cache records for storing data values, each cache record for storing one or more data values and an associated address indication for said one or more data values; a replicated address storage having a plurality of entries, each entry having a predetermined associated cache record within the cache storage and being arranged to replicate the address indication stored in said associated cache record; first error detection circuitry associated with said cache storage; a cache location avoid storage having at least one record, the cache location avoid storage being associated with the first error detection circuitry; responsive to a cache record of the cache storage being accessed, the first error detection circuitry being arranged to determine whether a cache record error exists for said accessed cache record; on detection of said cache record error, said cache location avoid storage being arranged to cause one of said at least one record to be allocated to store a cache record identifier for the accessed cache record; second error detection circuitry associated with said replicated address storage; responsive to an entry of the replicated address storage being accessed, the second error detection circuitry being arranged to determine whether an entry error exists for said accessed entry; on detection of said entry error, the second error detection circuitry preventing use of the address indication currently stored in the accessed entry, and issuing a command to said cache location avoid storage to cause one of said at least one record of said cache location avoid storage to be allocated to store the cache record identifier for the cache record of said cache storage associated with said accessed entry of the replicated address storage; and any cache record whose cache record identifier is stored in the cache location avoid storage being logically excluded from the plurality of cache records of the cache storage for the purposes of subsequent operation of the cache storage.

Viewed from a third aspect, the present invention provides a method of handling errors in a data processing apparatus, said data processing apparatus comprising processing circuitry for performing data processing operations, a cache storage having a plurality of cache records for storing data values for access by the processing circuitry when performing said data processing operations, each cache record for storing one or more data values and an associated address indication for said one or more data values, and a replicated address storage having a plurality of entries, each entry having a predetermined associated cache record within the cache storage and being arranged to replicate the address indication stored in said associated cache record, the method comprising the steps of: providing a cache location avoid storage having at least one record; responsive to a cache record of the cache storage being accessed, performing a first error detection operation to determine whether a cache record error exists for said accessed cache record; on detection of said cache record error, allocating one of said at least one record of said cache location avoid storage to store a cache record identifier for the accessed cache record; responsive to an entry of the replicated address storage being accessed, performing a second error detection operation to determine whether an entry error exists for said accessed entry of the replicated address storage; on detection of said entry error, preventing use of the address indication currently stored in the accessed entry of the replicated address storage, and issuing a command to said cache location avoid storage; responsive to said command, allocating one of said at least one record of said cache location avoid storage to store the cache record identifier for the cache record of said cache storage associated with said accessed entry of the replicated address storage; and logically excluding any cache record whose cache record identifier is stored in the cache location avoid storage from the plurality of cache records of the cache storage for the purposes of subsequent operation of the cache storage.

Viewed from a fourth aspect, the present invention provides a data processing apparatus, comprising: processing means for performing data processing operations; cache storage means having a plurality of cache record means for storing data values for access by the processing means when performing said data processing operations, each cache record means for storing one or more data values and an associated address indication for said one or more data values; a replicated address storage means having a plurality of entry means, each entry means having a predetermined associated cache record means within the cache storage means, and each entry means for replicating the address indication stored in said associated cache record means; first error detection means associated with said cache storage means; a cache location avoid storage means having at least one record means, the cache location avoid storage means being associated with the first error detection means; responsive to a cache record means of the cache storage means being accessed, the first error detection means for determining whether a cache record error exists for said accessed cache record means; on detection of said cache record error, said cache location avoid storage means for causing one of said at least one record means to be allocated to store a cache record identifier for the accessed cache record means; second error detection means associated with said replicated address storage means; responsive to an entry of the replicated address storage means being accessed, the second error detection means for determining whether an entry error exists for said accessed entry means; on detection of said entry error, the second error detection means for preventing use of the address indication currently stored in the accessed entry means, and for issuing a command to said cache location avoid storage means to cause one of said at least one record means of said cache location avoid storage means to be allocated to store the cache record identifier for the cache record means of said cache storage means associated with said accessed entry means of the replicated address storage means; and any cache record means whose cache record identifier is stored in the cache location avoid storage means being logically excluded from the plurality of cache record means of the cache storage means for the purposes of subsequent operation of the cache storage means.

BRIEF DESCRIPTION OF THE DRAWINGS

The present invention will be described further, by way of example only, with reference to embodiments thereof as illustrated in the accompanying drawings, in which:

FIG. 5A is a diagram schematically illustrating the cache location avoid cache provided in association with the cache storage in accordance with one embodiment;

FIG. 5B is a diagram schematically illustrating the cache location avoid cache provided in association with the replicated address storage in accordance with one embodiment;

DESCRIPTION OF EMBODIMENTS

Figure 1:
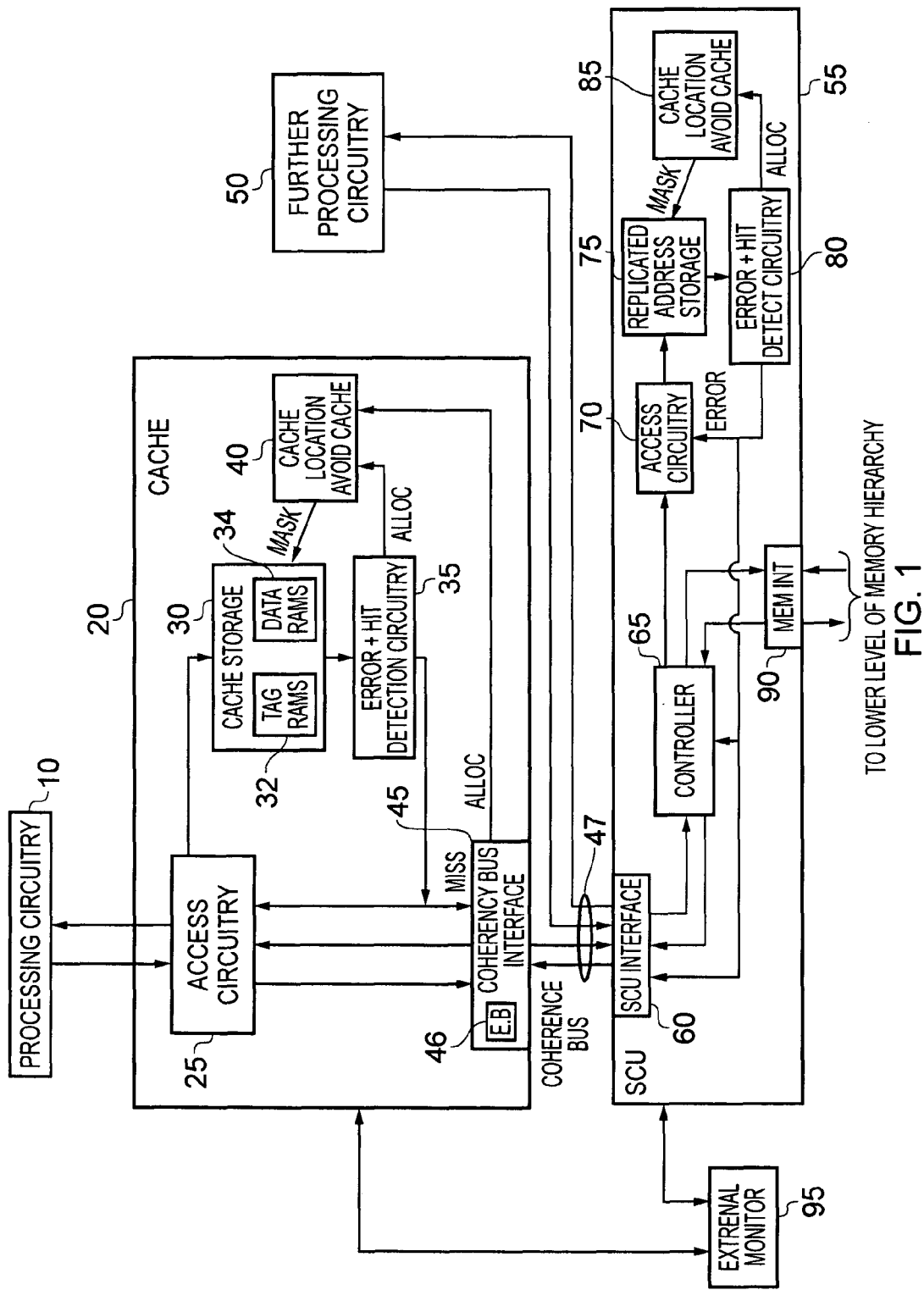
FIG. 1 is a block diagram of a data processing apparatus in accordance with a first embodiment of the present invention.

FIG. 1 is a block diagram of a data processing apparatus in accordance with a first embodiment. Processing circuitry 10, which in one embodiment may take the form of a processor core, is coupled to its own local cache 20, which in turn interfaces with one or more lower levels of the memory hierarchy (which may include one or more further caches) via a coherency bus 47 and a snoop control unit (SCU) 55. The processing circuitry 10 during operation will issue various access requests seeking to access data values from memory. If those data values are located within the cache 20, they will typically be accessed in the cache avoiding the time penalty of having to access any of the further levels of the memory hierarchy.

The processing circuitry may have access to a unified cache provided for instructions and data, or alternatively may have access to a separate instruction cache for storing instructions for access by the processing circuitry, and a further separate data cache for storing data for access by the processing circuitry. For the purposes of the following description, it will be assumed that the cache 20 is a data cache, but the principles of the present invention may also be applied in respect of an instruction cache or a unified cache.

Typically the processing circuitry 10 will only perform read access requests in respect of instructions, but may issue either read or write access requests in association with data. Certain regions of memory may be specified as write through (WT) regions, whilst other regions of memory may be specified as write back (WB) regions of memory. Further, some regions of memory may be specified as cacheable whilst others are specified as non-cacheable.

If the processing circuitry 10 issues a write access request specifying an address which is in a cacheable region of memory, then if a hit occurs within the cache 20, the data which is the subject of the access request will be updated directly in the cache. If the address relates to a write through region of memory, then an update to memory will also be performed at that time (or at least an entry will be made in a write buffer to ensure that the main memory is updated as soon as possible), but if the access address relates to a write back region of memory, then typically no update will be made at that time in the main memory, and instead a dirty bit associated with the relevant cache line will be set to indicate that the cache line is dirty. When a cache line is later evicted from the cache, if the cache line is valid and the dirty bit is set, then an eviction process takes place to update the stored data values in main memory.

The cache 20 may be arranged in a variety of ways, but for the purposes of discussing an embodiment of the present invention it will be assumed that the cache is an n-way set associative cache. This means that for any particular address specified in an access request, and assuming that address relates to a cacheable region of memory, then a lookup procedure will be performed in the cache for a particular set of the cache, the particular set in question being dependent on the address. Each set will typically include one cache line in each of the ways of the cache.

As shown in FIG. 1, all accesses to the cache storage 30 occur via the access circuitry 25. The cache storage 30 will typically include a set of tag RAMs 32 and a set of data RAMs 34, typically a separate tag RAM and data RAM being provided for each way of the cache. Each data RAM will comprise a plurality of cache lines, with each cache line being arranged to store one or more data values. A corresponding entry in the associated tag RAM will then store an address indication for those data values, along with a number of control bits (for example a valid bit, a dirty bit, etc) (in some embodiments these control bits may actually be stored in a separate RAM structure to the tag RAM). In addition, both the cache lines and the tag RAM entries will typically include error correction code data (also referred to herein as error data), which is redundant data used to detect the presence of an error in the contents of the tag RAM entry or the cache line.

When an access to the cache storage 30 takes place, the error and hit detection circuitry 35 is used to determine whether a hit in the cache storage 30 has been detected. This is typically done by using a set portion of the address (also referred to as an index portion) specified by the access request to identify a particular set of the cache, and then to identify whether the address indicators (also referred to as TAG values) stored in the relevant tag RAM entries for that set match a tag portion of the address. However, as discussed earlier, both hard and soft errors can affect information held within the cache, and accordingly the error and hit detection circuitry 35 also implements an error correction mechanism to seek to enable correct operation of the cache to be maintained even in the presence of such errors.

The error correction mechanism of embodiments of the present invention is based on a "correct-and-retry" scheme. In particular, in one embodiment, if an error is detected within one of the cache lines or associated tag RAM entries subjected to an access, then the relevant cache line is cleaned and invalidated, whereafter the access is re-performed. In one embodiment, the mechanism supports use with caches that can cache from write back regions of memory, and accordingly in such instances the clean and invalidate operation will require the ability to evict cache lines to memory if they are dirty and valid. To support this, it is not only necessary on evicting a cache line to ensure that the data values in the cache line are corrected if need be before being written to memory, but it is also clearly necessary to make sure that the contents of the relevant tag RAM entry are also correct, in order to ensure that the tag value was correct, and also that the control bits have been interpreted correctly.

In addition to this, when using a correct-and-retry type of scheme, then it is possible that after the retry any subsequent RAM access is faced with the same error if the errors in question were due to hard errors.

To alleviate these problems, the cache 20 provides a cache location avoid cache 40 comprising one or more records, with those records being populated by the error and hit detection circuitry 35 upon detection of an error in an accessed cache record, as will be discussed in more detail below. If when an access is performed, the error and hit detection circuitry 35 detects a hit condition, and no error is detected, then a hit signal will be returned to the access circuitry 25. In the event that the access request is a read access request, the access circuitry will then notify the processing circuitry 10 that a hit has occurred, and the required read data will be routed back to the processing circuitry from the error and hit detection circuitry 35. In the event of a write access being performed, the presence of the asserted hit signal will cause the write data provided by the processing circuitry 10 to be written into the relevant cache line of the data RAMs 34 via the access circuitry 25.

If no errors are detected by the error and hit detection circuitry 35 when performing a cache access in response to an access request issued by the processing circuitry 10, but a hit condition is not detected, then a cache miss signal will be output to the coherency bus interface 45 to cause a linefill operation to be performed. As part of that process, a cache record within the tag and data RAMs 32, 34 will be identified as a victim cache record whose contents are to be cleaned, and a cache line's worth of data from the lower levels of the memory hierarchy will be retrieved into a linefill buffer for writing into that victim cache record via the access circuitry 25. In the event that the victim cache record contains valid and dirty data, then the data will be evicted via an eviction buffer (E.B) 46 to the further levels of the memory hierarchy.

If, when performing an access in the tag and data RAMs 32, 34, an error is detected by the error and hit detection circuitry 35, the hit signal is ignored by the access circuitry 25, and instead a retry signal will be asserted to the access circuitry, along with a corresponding clean and invalidate signal. Further, as shown in FIG. 1, an allocate signal will be issued to the cache location avoid cache 40.

The access circuitry 25 is responsive to the clean and invalidate signal issued by the error and hit detection circuitry 35 to perform a clean and invalidate operation in respect of a cache record for which the error was detected. Typically, side band signals will be issued from the error and hit detection circuitry 35, providing index and way values identifying a particular cache record where an error has been detected. Further, in one embodiment, those side band signals will also identify the location where the error occurred, in particular whether the error occurred in the tag RAM entry 32 or the data RAM cache line 34 of the identified cache record. The cache maintenance operation performed by the access circuitry 25 involves performing a clean and invalidate operation in respect of a cache record for which an error has been detected. Hence, the cache record is first corrected using the error code data included within the relevant tag RAM entry and the data cache line, and then that cache record is invalidated. If it is determined following correction that the cache record contains valid and dirty data, then this clean and invalidate operation will also involve the eviction of the data corrected via an eviction buffer 46 to the lower levels of the memory hierarchy. Once the clean and invalidate operation has been completed, the access circuitry 25 then retries the access.

The allocate signal issued by the error and hit detection circuitry 35 will cause a record to be allocated in the cache location avoid cache (CLAC) 40 to identify the cache record for which an error has been detected. As will be discussed in more detail later with reference to FIG. 5A, the index and way values identifying the cache record where an error was detected are stored within a record of the CLAC, along with error location information identifying whether the error occurred in the tag RAM entry or the data RAM cache line of the relevant cache record.

Once a cache record is identified in the CLAC 40, then that cache record is masked from subsequent operations of the cache storage 30. As a result, whenever the tag and data RAMs 32, 34 are subsequently accessed, any cache record identified in the CLAC 40 is effectively excluded from that access, as a result of which a hit will never be detected in that cache record and the cache record will never be available for selection as the way into which a cache line is to be allocated. In addition, no further error correction processes will be performed in respect of that cache record.

Through use of the CLAC 40, it can be seen that a hardware mechanism is provided for detecting an error in the cache storage, and for removing a cache record exhibiting an error from the allocation pool of cache records available within the cache storage 30. However, as shown in FIG. 1, in embodiments of the present invention, the data processing apparatus is a coherent system comprising additional processing circuits such as the further processing circuitry 50, the processing circuitry 10 and further processing circuitry 50 sharing access to memory. The further processing circuitry 50 can take a variety of forms, and hence for example may be a processor core, a hardware accelerator, a direct memory access (DMA) engine, an advanced coherency port, etc. The further processing circuitry 50 may or may not have its own local cache. In addition, it will be appreciated that more than one further processing circuit 50 may be provided. Purely by way of particular example, in one embodiment the data processing apparatus may consist of four processor cores, each with an associated cache, and accordingly there will be four sets of components 10, 20 in such a system.

Since any further processing circuitry 50 within the apparatus may wish to access data which the processing circuitry 10 has cached in is local cache storage 30, steps need to be taken to ensure that each processing circuit has a consistent view of memory. This is achieved in FIG. 1 through the use of the SCU 55. In particular, the SCU monitors all access requests issued by the processing circuits 10, 50 over the coherency bus 47 and applies a cache coherency protocol in order to ensure that the data held in any local caches, such as the local cache 20, is kept up-to-date. In particular, the SCU operates as cache coherency circuitry to ensure that when one processing circuit updates data in its local cache, any copies of that data in the caches associated with the other processors will either be appropriately updated or invalidated in those local caches to ensure coherency. It will be appreciated that a number of cache coherency protocols can be used, and in one embodiment the cache coherency protocol used is the MESI cache coherency protocol.

To assist the SCU 55 in implementing the cache coherency protocol, the SCU 55 maintains a replicated address storage 75 for each cache 20. The replicated address storage 75 has a plurality of entries, each entry having a predetermined associated cache record within the cache storage 30 of the corresponding cache 20, and being arranged to replicate the address indication stored in the associated cache record. In one embodiment there is a one-to-one relationship between a cache record in the cache storage 30 and an associated entry in the replicated address storage 75. In one particular embodiment, the replicated address storage 75 is organised structurally in the same way as the cache storage, and hence if the cache storage is an n-way set associative cache the replicated address storage will also be provided as an n-way set associative storage structure. Whilst the replicated address storage 75 can store a copy of every address indication provided within the tag RAMs 32 of the cache storage 30 of the corresponding cache 20, in one embodiment each entry of the replicated address storage 75 replicates the address indication stored in the associated cache record if a data value stored in the associated cache record is allowed to be shared with at least one further processing circuit 50.

Accordingly, if the further processing circuit 50 issues an access request, this will be received via the SCU interface 60 and notified to the controller 65. The controller 65 will then use the access circuitry 70 to perform a lookup operation within the replicated address storage 75 to determine whether the cache 20 may be storing the data value requested by the further processing circuitry 50. As shown in FIG. 1, the replicated address storage 75 has associated error and hit detection circuitry 80 and an associated cache location avoid cache (CLAC) 85, and the error and hit detection circuitry 80 and CLAC 85 operate in an analogous manner to that discussed earlier with reference to the error and hit detection circuitry 35 and CLAC 40 provided within the cache 20, although as will be discussed in more detail later the information stored within the CLAC 40 and the CLAC 85 differ slightly.

Assuming no errors are detected, and a hit is detected in the replicated address storage 75, then the SCU 55 will issue a coherency request to the coherency bus interface 45 of the cache 20 to cause a lookup to be performed within the cache storage 30 in order to determine whether the data being requested by the further processing circuitry 50 is present within the cache storage 30. This lookup is needed only if the SCU does not monitor all accesses and hence does not have a complete view of the CPU contents. Dependent on the type of access being performed by the further processing circuitry, and the cache coherency protocol being employed, this may cause the entry in the cache storage 30 to be cleaned and invalidated and/or the data stored in the relevant cache record to be returned to the SCU 55 for passing to the further processing circuitry 50.

If the requested data cannot be found within the cache 20, or it is determined with reference to the replicated address storage 75 that no coherency request needs to be issued to the cache 20 since the cache 20 will not be storing the data value being requested, then the SCU 55 can access the lower levels of the memory hierarchy via the memory interface 90 in order to retrieve the required data. The SCU 55 can also perform such data retrieval operations in response to linefill requests issued from the coherency bus interface 45 due to a cache miss occurring in the cache 20 for a regular access request issued by the processing circuitry 10.

As will be discussed in more detail later, an external monitor 95 may be provided for responding to one or more predetermined events to analyse the contents of the CLAC 40 and/or the contents of the CLAC 85 in order to determine whether the cache records identified in the CLAC 40 or the entries of the replicated address storage 75 identified in the CLAC 85 are actually exhibiting hard errors or soft errors. In the event that only soft errors are being exhibited, the relevant records in the CLAC 40, 85 can then be invalidated to free up space in the CLACs 40, 85 for future allocations.

Due to the fact that the replicated address storage 75 replicates address indications stored within the tag RAMs 32 of the cache storage 30, an issue arises as to how to ensure correct operation of the SCU when an error is detected in a cache record of the cache storage 30, and to ensure correct operation of the cache 20 when an error is detected in an entry of the replicated address storage 75. As will be discussed in more detail later, in accordance with embodiments of the present invention, correct operation is ensured whilst keeping communication between the SCU and the cache 20 to a minimum. In particular, as will be discussed in detail later, when an error is detected in a cache record of the cache storage 30, an allocation is made in the CLAC 40, but the occurrence of this error is not notified to the SCU. However, when an error is detected in an entry of the replicated address storage 75, a record is allocated in the CLAC 85, and in addition a command is issued over the coherency bus 47 to the cache 20, to cause the corresponding cache record of the cache storage to be cleaned and invalidated, and for a record to then be allocated in the CLAC 40 for that cache record. This approach has been found to ensure correct operation, whilst minimising the communication required over the coherency bus, thereby reducing the performance impact resulting from the detection and containment of errors within the data processing apparatus.

Figure 2:
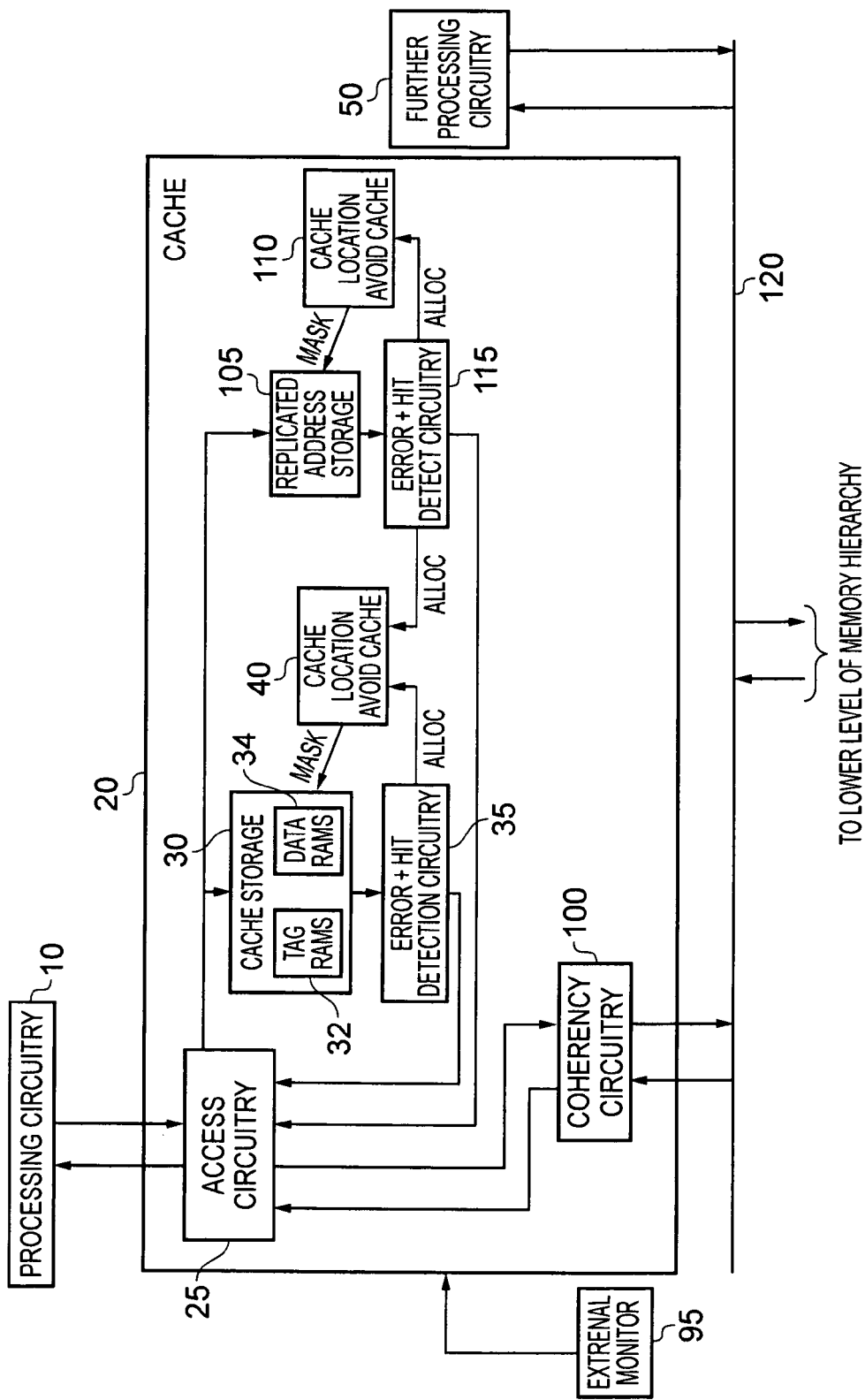
FIG. 2 is a block diagram of a data processing apparatus in accordance with an alternative embodiment of the present invention.

Whilst in the embodiment of FIG. 1, a centralised SCU 55 is used to implement the required coherency circuitry, in an alternative embodiment the functions of the SCU may be distributed, with individual coherency circuits being associated with each cache 20. Such an embodiment is illustrated schematically in FIG. 2. Those components which are the same as discussed earlier with reference to FIG. 1 have been indicated by the same reference numerals. As shown in FIG. 2, coherency circuitry 100 is provided within the cache 20, and is arranged to snoop accesses occurring over the bus 120. Accordingly, if the further processing circuitry 50 issues an access request, the coherency circuitry 100 will apply the cache coherency protocol in order to determine whether any coherency operations need to be performed in respect of the cache storage 30. In particular, the coherency circuitry 100 will use the access circuitry 25 to perform a lookup within the replicated address storage 105. The replicated address storage 105, error and hit detect circuitry 115 and cache location avoid cache 110 operate in the same way as the replicated address storage 75, error and hit detect circuitry 80 and cache location avoid cache 85 of FIG. 1. In particular, if a hit is detected in the replicated address storage 105, and no error is detected, the error and hit detect circuitry 115 will propagate the hit signal back to the access circuitry 25, whereafter a coherency operation can be performed in respect of the cache storage 30, the form of that coherency operation being dependent on the cache coherency protocol employed.

If an error is detected by the error and hit detect circuitry 115, then in addition to allocating an entry in the cache location avoid cache 110, an allocate signal will also be issued to the cache location avoid cache 40. In addition, the relevant cache record in the cache storage 30 will be cleaned and invalidated. In one embodiment, the allocation into the CLAC 40 and the clean and invalidate of the relevant cache record of the cache storage 30 is performed prior to allocating an entry in the CLAC 110. In addition to a record being allocated in the CLAC 110, the access circuitry 25 will also be caused to clean and invalidate the relevant entry in the replicated address storage 105, and to then retry the access to the replicated address storage 105.

As with the approach in FIG. 1, it should be noted that whilst errors detected in the entry of the replicated address storage 105 cause records to be allocated into both the CLAC 110 and the CLAC 40, when an error is detected in the cache record of the cache storage 30, an entry is only made in the CLAC 40, and no corresponding entry is made in the CLAC 110.

Any other further processing circuit 50 which also has a local cache will have that local cache arranged in the same way as the cache 20 associated with the processing circuitry 10, and accordingly it will be seen that in such embodiments a plurality of distributed coherency circuits 100 implement the cache coherency protocol, rather than using a centralised SCU 55 as shown in FIG. 1.

In a similar manner to that described earlier with reference to FIG. 1, an external monitor 95 can again be used to analyse records in the CLAC 40 and CLAC 110 in order to determine whether the cache records or entries in the replicated address storage identified by those CLAC records are exhibiting soft or hard errors, with any records associated with soft errors then being invalidated to free up space in the relevant CLAC 40, 110.

Figure 3:
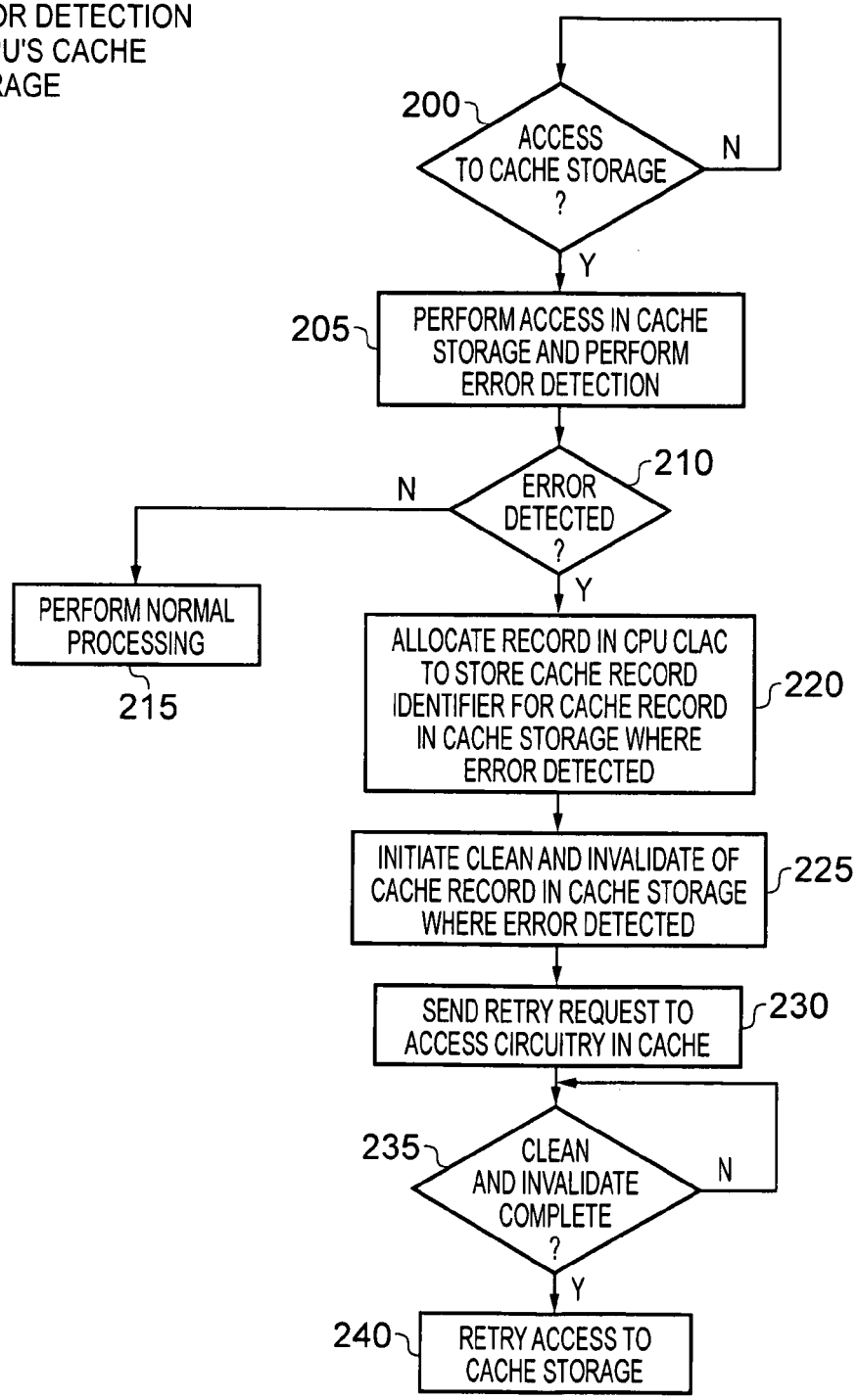
FIG. 3 is a flow diagram illustrating the error detection steps performed in response to an access to the cache storage of FIG. 1 in accordance with one embodiment.

FIG. 3 is a flow diagram illustrating the steps performed when accessing the cache storage, in particular FIG. 3 showing the steps performed on detection of an error. At step 200, it is determined whether an access to the cache storage 30 is required, and when such an access is required, the access is then performed in the cache storage at step 205, along with an associated error detection operation performed by the error and hit detection circuitry 35. At step 210, it is determined whether an error has been detected, and if not the process proceeds to step 215, where normal cache access processing takes place, the processing performed being dependent upon whether a hit was detected or not during the access at step 205.

However, assuming that an error has been detected at step 210, then any hit signal generated by the error and hit detection circuitry 35 is ignored, and instead at step 220, a record is allocated in the CLAC 40 (also referred to herein as the CPU CLAC considering an embodiment where the processing circuitry 10 is a CPU), that record being allocated to store a cache record identifier for the cache record in the cache storage 30 where the error was detected. If errors are detected in multiple different ways during the access performed at step 205, then in one embodiment, separate records in the CLAC 40 can be populated. However, in an alternative embodiment, a single CLAC record can be used to identify the errors in multiple ways for a particular index, allowing a single record of the CLAC to be used in the event of multiple errors being detected at step 205. Similarly, if an error is detected in both the tag RAM entry and the corresponding data RAM cache line, then separate records could be allocated in the CLAC 40, but in one embodiment that information can be stored within a single CLAC record.

At step 225, the access circuitry 25 is caused to perform a clean and invalidate operation in respect of the cache record in the cache storage 30 where the error was detected. In addition, at step 230, a retry request is issued to the access circuitry 25 within the cache 20. Thereafter, the access circuitry 25 waits for the clean and invalidate operation to complete, and once it has completed, the access to the cache storage is retried at step 240. During the retry of the access to the cache storage, the cache record that gave rise to an error being detected at step 210 will no longer be referenced, since that cache record will be masked by virtue of it being identified within the CLAC 40, and accordingly assuming no other error is now detected in another way of the set, it is expected that the retry of the access request will cause normal processing to occur via step 215. Note that if an error is detected in another way, the access is just retried once more: at each retrial, the access sees one error less so that no error will eventually be detected.

Since the SCU 55 of FIG. 1 (or the cache coherency circuitry 100 of FIG. 2) only monitors coherent linefills, the SCU will not be aware of the above steps taken in respect of the cache storage 30 and CLAC 40 on detection of an error at step 210, and instead the replicated address storage 75 (or replicated address storage 105 for the example of FIG. 2) will remain unchanged, and accordingly the SCU will assume that the relevant cache line is still present within the cache storage 30. Accordingly, when a coherent access request issued by the further processing circuitry 50 requests that cache line, the SCU lookup within the replicated address storage 75 will produce a hit, and a coherency request will be issued to the cache 20 to request the relevant cache line from the cache storage 30. However, when the access circuitry 25 performs a lookup, it will determine that the data is not present, and will issue a "not present" response to the SCU. This will merely then cause the SCU to access the data from another source, such as the lower level of the memory hierarchy. As a result, the above mechanism of FIG. 3 is safe by construction, and merely causes a slight degradation in performance in the event of the above scenario occurring. In particular, any coherent reads to the cache line contents that have been removed from the cache storage 30 will suffer an additional latency equal to the time taken for the coherency request to be propagated to the cache 20 and for the response to be sent back to the SCU. However, the address for the relevant cache line will not remain indefinitely in the replicated address storage 75, since any write or migration request will invalidate that address indication from the replicated address storage 75. Accordingly, the performance impact in practice is very minimal, and is the same as the eviction of a coherent cache line by a non-coherent one. In addition, the avoidance of having to notify any errors detected in the cache storage 30 to the SCU 55, and the avoidance of any associated updates in the replicated address storage 75, significantly reduces the level of communication over the coherency bus 47, and significantly reduces the complexity of the SCU design.

Figure 4A:
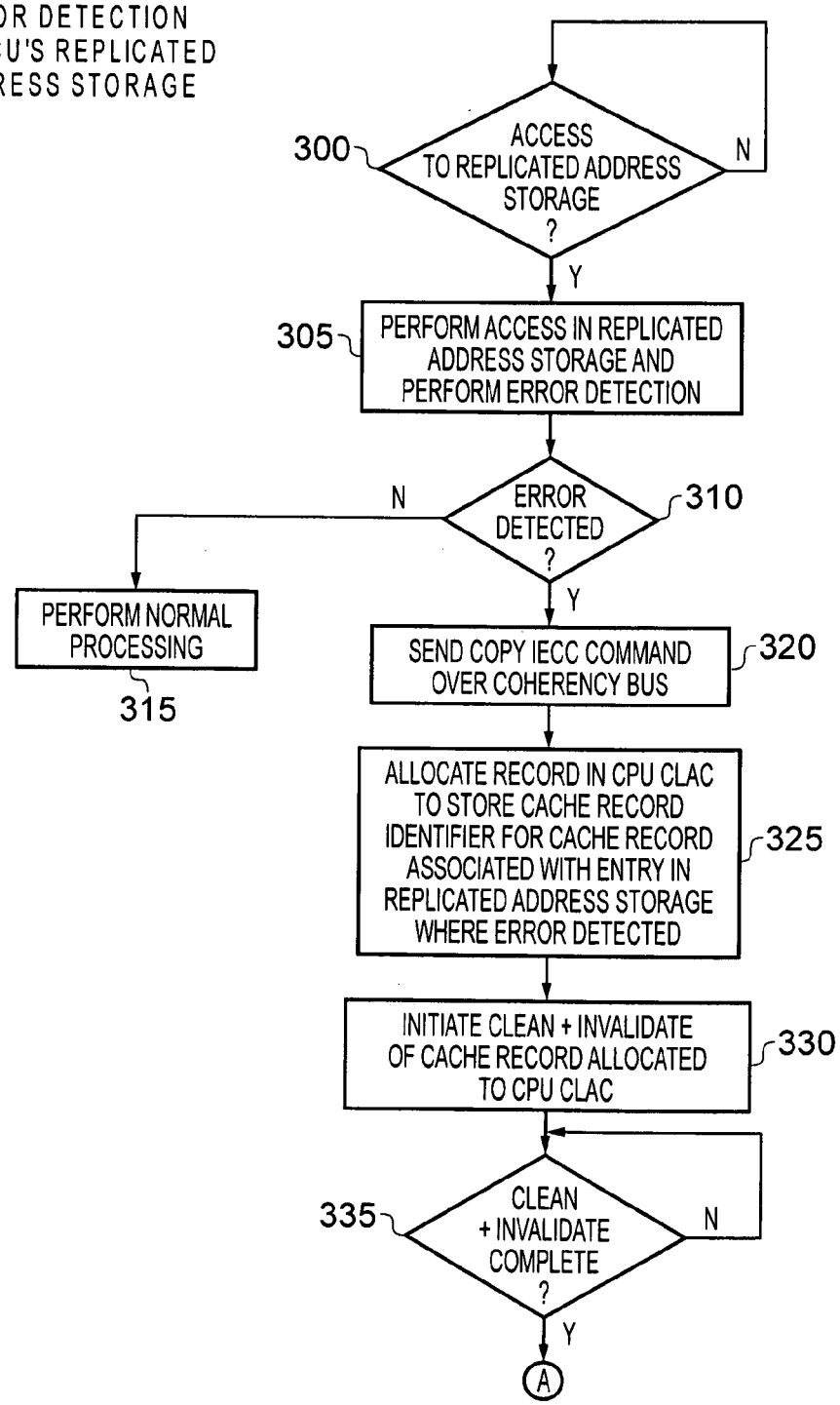
FIGS. 4A and 4B are flow diagrams illustrating the error detection steps performed in response to an access to the replicated address storage of FIG. 1 in accordance with one embodiment.
Figure 4B:
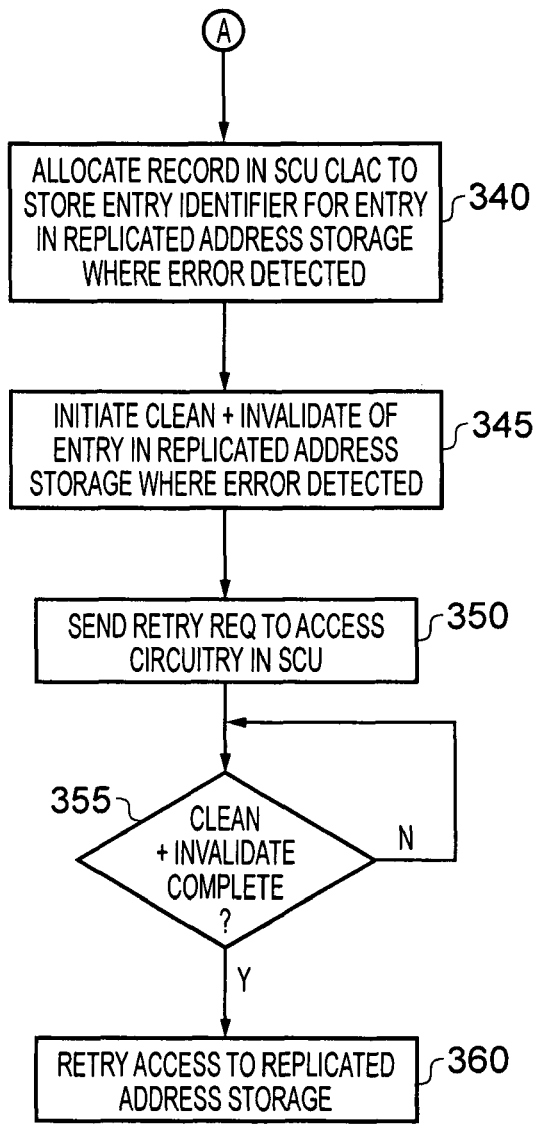

FIGS. 4A and 4B illustrates the steps performed when accessing an entry of the replicated address storage, in particular detailing the steps performed upon detection of an error in such an entry of the replicated address storage 75. The replicated address storage 75 contains a copy of the address indications in the cache storage 30 that are pessimistic. In particular, the corresponding data values may no longer be resident in the cache storage 30 anymore, whereas the address indication is still present in the replicated address storage 75. However, the cache storage 30 should never store a cache line's worth of data that can be shared with the further processing circuitry 50, without the corresponding address indication being stored in the replicated address storage 75. As a result, if an error is detected in an entry of the replicated address storage, and that entry is then going to be masked by allocation in the CLAC 85, it is important that the corresponding cache record is also removed from the cache storage 30 in order to ensure correct operation of the SCU. In one embodiment, this is achieved through the sequence of steps set out in FIGS. 4A and 4B.

At step 300, it is determined whether an access to the replicated address storage 75 is required, and if it is that access is performed at step 305, and any associated error detection is performed by the error and hit detect circuitry 80. At step 310, it is then determined whether an error has been detected, and if not normal processing takes place at step 315. As discussed earlier, in the event of a hit, this will result in the coherency request being issued to the cache 20 to cause the required coherency operations to be performed in respect of the cache storage 30.

However, if an error is detected at step 310, then no such coherency request is issued, and instead at step 320 a command is issued from the SCU interface 60 to the coherency bus interface 45 over the coherency bus 47, this command being referred to herein as a COPYIECC command. The COPYIECC command is a command which causes the cache 20 to clean and invalidate the cache record at the index and way specified by the COPYIECC command, and to then cause a cache record identifier for that cache record to be stored within the CLAC 40. In particular, at step 325 an allocate signal is issued to the CLAC 40 to cause a record to be allocated to store the cache record identifier for the cache record associated with the entry in the replicated address storage 75 where the error was detected. At step 330, a clean and invalidate operation is performed by the access circuitry 25 in respect of the cache record that is being allocated into the CLAC 40.

At step 335, the process then waits for the clean and invalidate operation performed at step 330 to be completed, and once it has completed, the process then proceeds to step 340. In particular, a completion signal is issued to the SCU interface 60 over the coherency bus 47 which is then routed to the controller 65. At step 340, this causes the SCU 55 to allocate a record in the CLAC 85 to store an entry identifier for the entry in the replicated address storage where the error was detected. In addition, at step 345, a clean and invalidate operation is performed by the access circuitry 70 in respect of the entry in the replicated address storage where the error was detected. A retry request is also issued to the access circuitry 70 in the SCU at step 350, and when it is then determined at step 355 that the clean and invalidate operation initiated at step 345 has completed, then the process proceeds to step 360 where the access to the replicated address storage is retried. Since the entry that gave rise to the error has now been masked from further use via the CLAC 85, then assuming no other errors are detected when the access is retried, it is expected that normal processing will now be performed at step 315.

It should be noted that in accordance with the above described process of FIGS. 4A and 4B, the invalidation of the entry of the replicated address storage 75 within the SCU 55 only occurs after the clean and invalidate operation in respect of the associated cache record in the cache storage 30 has successfully completed, in order to maintain coherency. Only then can the access to the replicated address storage be retried and the correct results obtained. In one embodiment, the details of the original access are retained inside an internal buffer of the access circuitry 70 until the completion signal is returned from the cache 20 to the SCU interface 60. During this period, other buffers in the access circuitry 70 can continue to be used to perform further accesses to the replicated address storage, and those accesses will merely stall if they attempt to access the entry of the replicated address storage where the error has been detected. An alternative approach would be for the SCU to systematically forward a coherency lookup request to the CPU while it is handling an error.

FIG. 5A schematically illustrates the records provided within the CLAC 40 in accordance with one embodiment. As shown in FIG. 5A, each record 400 includes an index value identifying the set containing a cache record where an error has been detected, and a way field identifying one or more ways of that set containing cache records where an error has been detected. In one embodiment, multiple ways can be identified in the way fields, and accordingly for a four-way set associative cache, up to four ways may be specified in the way field, allowing errors in up to all four ways to be identified by a single record 400. An error location field is also provided to identify whether an error has been detected in the tag RAMs 32 or the data RAMs 34. Again, if an error has been detected in both the tag RAMs and the data RAMs, then this can also be indicated in the error location field.

As also shown in FIG. 5A, each record 400 has an internal (I) bit whose value indicates whether the error has been detected in the cache record of the cache storage, or in the associated entry of the replicated address storage 75. In one embodiment, the I bit is set to a logic one value if the error has been detected in the cache record, and is set to a logic zero value if the error has been detected in the corresponding entry of the replicated address storage. In the event that an error is detected in both the cache record and the associated entry in the replicated address storage (irrespective of the timing at which the errors were identified), the internal bit will be set to the logic one value. As will be apparent from the later discussion of FIG. 7, this ensures correct operation in the event that the external monitor 95 causes the record in the CLAC 85 associated with the replicated address storage 75 to be invalidated.

Finally, as shown in FIG. 5A, each record 400 also includes status bits. In one embodiment, the status bits take the form of a two bit value, a first value (e.g. 00) indicating that the record is not valid, and accordingly is available for allocation, a second value (e.g. 10) indicating that the record is valid but not yet analysed by an external monitor, and a third value (e.g. 11) indicating that the record is valid, has been analysed, and is considered to relate to a hard error. Note that this status field relates to the whole record and consequently the external monitor may have to reanalyze an index/way already analyzed if a new error occurred at this location.

FIG. 5B schematically illustrates the data contained within the records of the CLAC 85 associated with the replicated address storage 75. As shown in FIG. 5B, each record 410 contains an index value, and then includes way fields for each processing circuitry that has its own associated local cache, identifying the ways of the replicated address storage provided for that cache where errors have been detected. In the example illustrated in FIG. 5B, it is assumed that the data processing apparatus includes four CPUs, each with their own local caches, and accordingly the SCU will have four replicated address storages. Assuming each replicated address storage is an n-way set associative storage structure replicating the n-ways of the associated cache storage 30, then these four way fields identify which ways of the corresponding replicated address storage errors have been detected in.

As also shown in FIG. 5B, each record 410 includes status bits. These status bits can take the same form as the status bits associated with the record 400 of the CLAC 40.

The number of records provided within the CLAC 40 and CLAC 85 is a matter of design choice. In one example embodiment, each CLAC has four records. However, different numbers of records can be provided, and indeed the number of records in each CLAC need not be the same.

Figure 6:
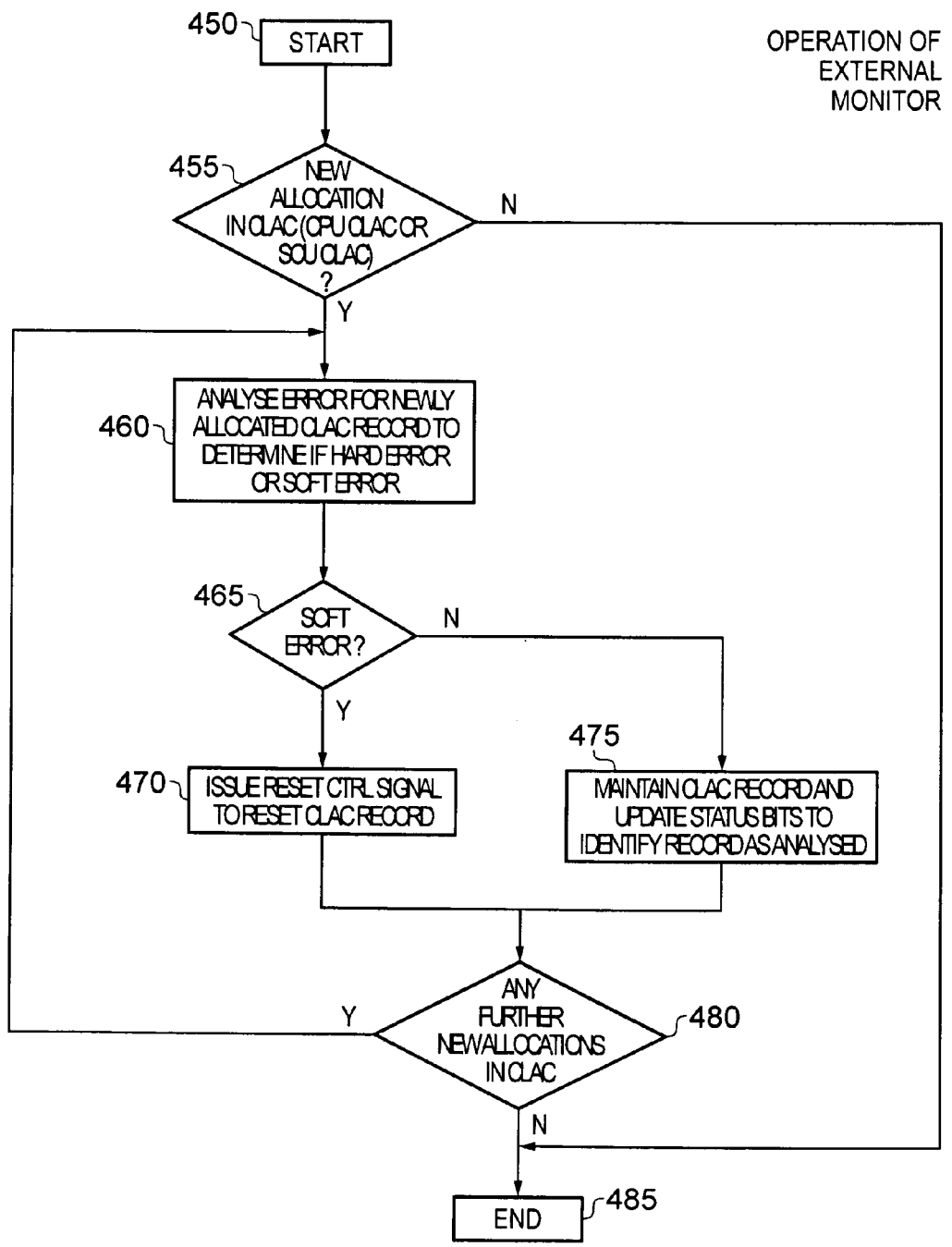
FIG. 6 is a flow diagram illustrating the operation of the external monitor of FIG. 1 or 2 in accordance with one embodiment of the present invention.

FIG. 6 is a flow diagram illustrating the operation of the external monitor 95 of FIG. 1 or 2 in accordance with one embodiment. The process starts at step 450, and at step 455 it is then determined whether there has been a new allocation into the CLAC 40 or the CLAC 85. In one embodiment, each of the CLACs 40, 85 is arranged to issue an event signal to the external monitor 95 when a new allocation takes place.

As an alternative to such an approach, the external monitor 95 may only be advised when either of the CLACs becomes full, in which event the decision at step 455 would be a determination as to whether one of the CLACs 40 or 85 has become full.

On determination of a new allocation into one of the CLACs 40, 85, the process proceeds to step 460, where the external monitor 95 analyses the error for a newly allocated CLAC record to determine if a hard error or a soft error has caused the allocation. Note that newly allocated means herein either a new entry pushed in the CLAC or an entry for which the way field has changed (for example by one way bit being changed from unset to set). In particular, for a newly allocated record in the CLAC 40, the external monitor 95 will analyse the cache record of the cache storage 30 identified by the cache record identifier in that newly allocated CLAC record in order to determine whether that cache record is exhibiting a soft error or a hard error. It will be appreciated by those skilled in the art that a number of tests could be performed to ascertain this, such as writing values to the cache record and reading them back.

Similarly, if the newly allocated record is in the CLAC 85, then the external monitor 95 will analyse the identified entry of the replicated address storage to determine whether it is exhibiting a soft error or a hard error.

At step 465, it is then determined whether the error is a soft error, and if not the process proceeds to step 475 where the CLAC record is maintained within the CLAC, and the status bits are updated to identify that the record has been analysed. Having regard to the earlier discussion of FIGS. 5A and 5B, this can be done by changing the status bits from 10 (i.e. entry not analysed) to 11 (i.e. entry analysed and error considered hard).

However, if it is determined at step 465 that the error is a soft error, then a reset control signal is issued at step 470 from the external monitor to the relevant CLAC to cause the CLAC to reset its CLAC record. This can be done by updating the status bits to 00 for the relevant record, thereby indicating that the record is invalid. However, as will be discussed further later with reference to FIG. 7, if the reset control signal is sent to the CLAC 85 associated with the replicated address storage, then some additional actions are required.

Following steps 470 or 475, then it is determined at step 480 whether there are any further new allocations in the CLAC, and if so the process returns to step 460. However, once all new allocations in the CLAC have been analysed (and hence none of the records have status bits of 10), then the process ends at step 485.

Figure 7:
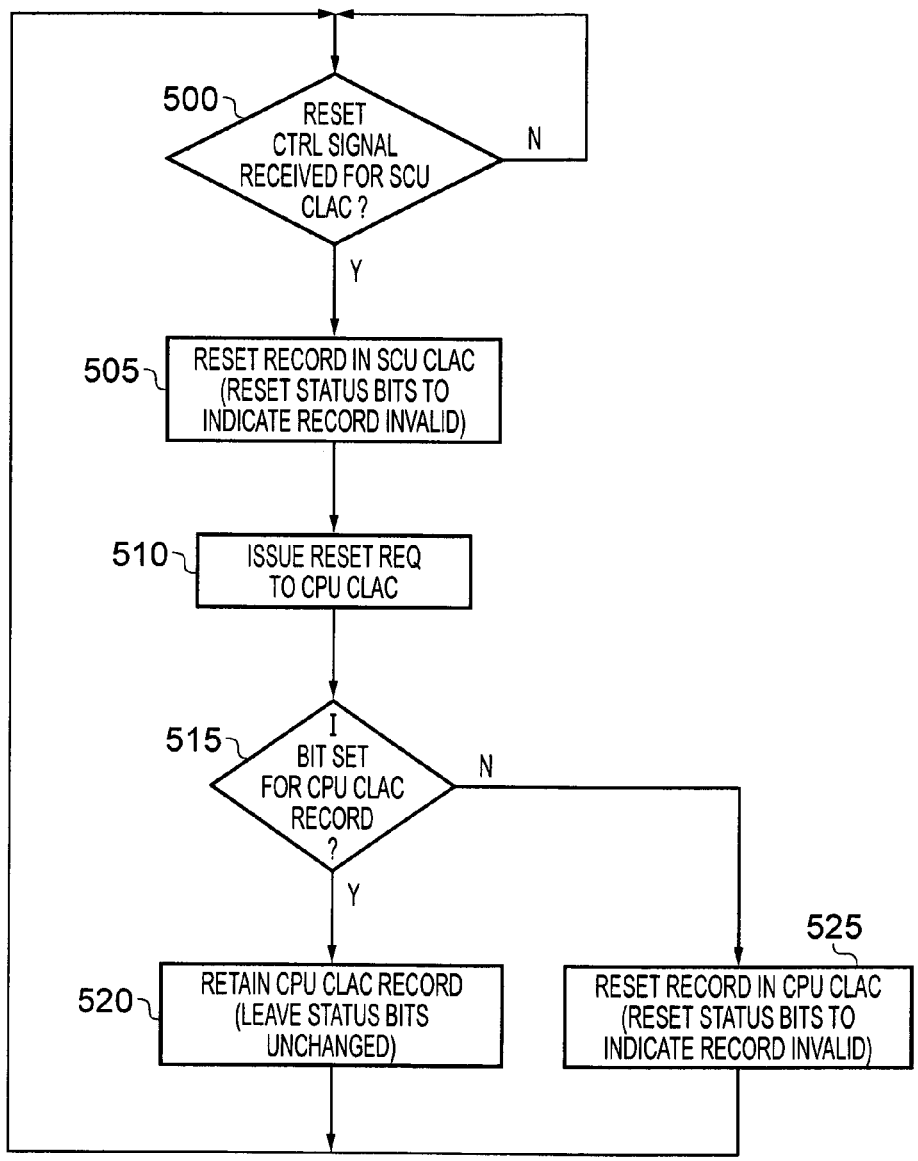
FIG. 7 illustrates how a reset control signal issued by the external monitor is processed when it relates to a record of the cache location avoid cache associated with the replicated address storage, in accordance with one embodiment.

FIG. 7 illustrates the sequence of steps performed when a reset control signal is issued from the external monitor to the CLAC 85 associated with the replicated address storage 75. At step 500, the CLAC 85 awaits receipt of such a reset control signal, and on receipt of such a reset control signal the process proceeds to step 505, where the status bits in the relevant record of the CLAC 85 are reset to indicate that the record is invalid. In addition, a reset request is issued over the coherency bus 47 to the CLAC 40 associated with the CPU's cache storage 30. At step 515, the CLAC 40 then determines whether, for the relevant CLAC record, the I bit has been set. As discussed earlier with reference to FIG. 5A, if it has been set, this indicates that an error has been observed in the identified cache record of the cache storage 30, whereas if it is not set it indicates that the error has not been observed in the associated cache record, and accordingly the CLAC record was only allocated because of the error in the corresponding replicated address storage entry. Accordingly, if the I bit is not set, the process proceeds to step 525, where the record in the CLAC 40 is reset by resetting the status bits to indicate that the record is invalid.

However, if the I bit is set, it is not safe to invalidate the entry, since an error has been detected in the associated cache record, and accordingly should be retained until an analysis of that cache record has been performed by the external monitor 95. Accordingly, the process proceeds to step 520, where the record in the CLAC 40 is retained, leaving the status bits unchanged.

Following steps 520 or 525, the process then returns to step 500.

In the example of FIG. 5B, it is assumed that there are four CPUs each with their own local cache. Assuming the record in the CLAC 85 identifies that errors had been identified in respect of multiple of the replicated address storage structures associated with the various CPUs' caches, then the reset request issued at step 510 will be issued to each of the relevant CPUs' caches, and steps 515, 520, 525 will be performed independently in each of those caches to determine whether the associated record in the CPU's CLAC 40 should be reset or not.

It should be noted that in the proposed embodiment illustrated with reference to FIG. 5A, there is only a single I bit set for each record, even though errors in multiple ways may be identified in that record. Accordingly, using the above described reset approach of FIG. 7, if there is a hard (or unanalysed) error in the cache record for way X of the cache storage 30 and a soft error in way Y (where way Y does not equal way X) of the associated entry in the replicated address storage 75, then it will be seen that marking the relevant entry of way Y of the replicated address storage 75 as reusable (by invalidating the relevant record in the CLAC 85) will not remove the corresponding part of the record in the CLAC 40 because the internal bit has been set by observation of the hard (or unanalysed) error in the cache record of way X of the cache storage 30. However, the occurrence of this particular scenario is likely to be very rare, and hence in the embodiment described is not considered to be problematic. In an alternative embodiment, accommodation of this rare situation can easily be provided by providing an internal bit per way in each record of the CLAC 40.

Whilst in the flow diagrams of FIGS. 3, 4A, 4B, 6 and 7, many steps have been shown as being performed in a serial manner, it will be appreciated that in modern data processing systems, it will be possible to implement various of the steps in parallel, and hence these flow diagrams are intended to illustrate the steps taken in the described embodiment, rather than indicating that all of those steps have to be performed in a particular order or sequence.

From the above description of embodiments, it will be appreciated that such embodiments provide a hardware mechanism for detecting errors in a cache record or in a replicated address storage, and for removing such cache records or replicated address storage entries from the allocation pool available for future allocation. Further, such embodiments allow the errors to be correctly handled in a coherent system and prevent the errors from spreading within the system. Furthermore, such embodiments minimise the communication between the SCU 55 and the cache 20 (or indeed between the cache coherency circuitry 100 and the remainder of the cache circuitry 20 considering the embodiment of FIG. 2), and provide a very efficient mechanism for preventing the use of corrupted cache records and replicated address storage entries.

The techniques of embodiments of the present invention avoid the accumulation of errors in the coherent cluster, which otherwise would present the design with potentially high error rates, and might cause some of the errors to become fatal errors due to them not being corrected. The embodiments of the present invention hence provide support for efficiently handling hard errors within a coherent cluster. More particularly, embodiments of the present invention enable the support of detection and correction of hard errors in a cached coherent system, whilst increasing the reliability of the system and availability of the cache records.

In some embodiments, there may be sufficient CLAC records, and error rates may be low enough, that there is no need for an external monitor 95. However, where an external monitor is required, the techniques of the above described embodiments add simplicity and flexibility to the design. Indeed, the external monitor analysing a fault is not required to interfere with the cache 20 when analysing an error detected in the SCU 55, and conversely an error detected in the CPU's cache 20 does not require an analysis or setting to be made in the SCU 55 by the external monitor.

Further, since when an error is detected in the replicated address storage 75, and a corresponding record is allocated in the CLAC 85, a corresponding record is also allocated in the CLAC 40 of the corresponding cache 20, the analysis required by the external monitor 95 is straightforward, since the analyser can view each error as being contained to a particular module, e.g. a particular CPU's cache, the SCU, etc.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus, comprising:
   processing circuitry for performing data processing operations;
   a cache storage having a plurality of cache records for storing data values for access by the processing circuitry when performing said data processing operations, each cache record for storing one or more data values and an associated address indication for said one or more data values;
   a replicated address storage having a plurality of entries, each entry having a predetermined associated cache record within the cache storage and being arranged to replicate the address indication stored in said associated cache record;
   first error detection circuitry associated with said cache storage;
   a cache location avoid storage having at least one record, the cache location avoid storage being associated with the first error detection circuitry;
   responsive to a cache record of the cache storage being accessed, the first error detection circuitry being arranged to determine whether a cache record error exists for said accessed cache record;
   on detection of said cache record error, said cache location avoid storage being arranged to cause one of said at least one record to be allocated to store a cache record identifier for the accessed cache record;
   second error detection circuitry associated with said replicated address storage;
   responsive to an entry of the replicated address storage being accessed, the second error detection circuitry being arranged to determine whether an entry error exists for said accessed entry;
   on detection of said entry error, the second error detection circuitry preventing use of the address indication currently stored in the accessed entry, and issuing a command to said cache location avoid storage to cause one of said at least one record of said cache location avoid storage to be allocated to store the cache record identifier for the cache record of said cache storage associated with said accessed entry of the replicated address storage; and
   any cache record whose cache record identifier is stored in the cache location avoid storage being logically excluded from the plurality of cache records of the cache storage for the purposes of subsequent operation of the cache storage.

2. A data processing apparatus as claimed in claim 1, further comprising:
   at least one additional processing circuitry that does not have access to the cache storage; and
   cache coherency circuitry for performing a coherency operation to ensure a consistent view of said data values by both the processing circuitry and the at least one additional processing circuitry; and
   said replicated address storage being accessed by the cache coherency circuitry when performing said coherency operation.

3. A data processing apparatus as claimed in claim 2, wherein said coherency operation is performed by said cache coherency circuitry in response to a request issued by the at least one additional processing circuitry and specifying an address of a data value that is cacheable by the cache storage, the replicated address storage being referenced to determine whether the address indication for that specified address has been cached in the cache structure.

4. A data processing apparatus as claimed in claim 3, wherein each entry of the replicated address storage replicates the address indication stored in said associated cache record if the at least one data value stored in said associated cache record is allowed to be shared with said at least one additional processing circuitry.

5. A data processing apparatus as claimed in claim 2, further comprising:
a coherency bus; and
a coherency bus interface associated with the cache location avoid storage;
the coherency bus interconnecting said cache coherency circuitry and said coherency bus interface;
wherein the command issued by the second error detection circuitry on detection of said entry error is propagated from the cache coherency circuitry to the coherency bus interface via the coherency bus, from where the command is passed to the cache location avoid storage.

6. A data processing apparatus as claimed in claim 1, wherein said command issued by the second error detecting circuitry is also passed to the cache storage to force an invalidation of the cache record of said cache storage associated with said accessed entry of the replicated address storage.

7. A data processing apparatus as claimed in claim 6, wherein receipt of said command by the cache storage further forces a clean operation to be performed in respect of the at least one data value stored in the cache record of said cache storage associated with said accessed entry of the replicated address storage, the clean operation being performed prior to the invalidation of the cache record.

8. A cache apparatus as claimed in claim 1, wherein:
each record of the cache location avoid storage has a source flag associated therewith;
the cache location avoid storage being arranged, when allocating one of said at least one record to store a cache record identifier, to set the associated source flag to a first value if the allocation is in response to the detection of said cache record error by the first error detection circuitry, and to set the associated source flag to a second value if the allocation is in response to receipt of said command from the second error detection circuitry.

9. A data processing apparatus as claimed in claim 8, wherein for any cache record identifier stored in the cache location avoid storage, the associated source flag is set to the first value if both said cache record error has been detected by the first detection circuitry, and said entry error has been detected by the second error detection circuitry for the associated entry of the replicated address storage.

10. A data processing apparatus as claimed in claim 1, wherein on detection of said entry error, the second error detection circuitry is arranged to prevent use of the address indication currently stored in the accessed entry by applying an invalidate operation in respect of the accessed entry.

11. A data processing apparatus as claimed in claim 1, further comprising:
a further cache location avoid storage having at least one record, said further cache location avoid storage being associated with the second error detection circuitry;

on detection of said entry error, said further cache location avoid storage being arranged to cause one of said at least one record to be allocated to store an entry identifier for the accessed entry; and
any entry of the replicated address storage whose entry identifier is stored in the further cache location avoid cache being logically excluded from the plurality of entries of the replicated address storage for the purposes of subsequent operation of the replicated address storage.

12. A data processing apparatus as claimed in claim 11, wherein:
on detection of said cache record error by said first error detection circuitry, said cache record error is not reported to said further cache location avoid storage.

13. A data processing apparatus as claimed in claim 1, wherein responsive to an entry of the replicated address storage being subjected to a read access, the second error detection circuitry is arranged to determine whether an entry error exists for said accessed entry.

14. A data processing apparatus as claimed in claim 1, wherein said cache storage is a data cache.

15. A data processing apparatus as claimed in claim 2, wherein said at least one additional processing circuitry is one of a processor, a direct memory access (DMA) unit, and a data engine.

16. A data processing apparatus as claimed in claim 1, wherein said cache storage is a level 1 cache tightly coupled to the processing circuitry.

17. A data processing apparatus as claimed in claim 1, wherein said cache storage is a level 2 cache.

18. A data processing apparatus as claimed in claim 1, further comprising:
analysis circuitry for determining whether said cache record error is a soft error or a hard error, and for invalidating a cache record identifier stored in the cache location avoid storage if that cache record identifier was stored in the cache location avoid storage due to a soft error;
whereby, as a result of the cache record identifier being invalidated, the associated cache record is no longer logically excluded from the plurality of cache records of the cache storage for the purposes of subsequent operation of the cache storage.

19. A data processing apparatus as claimed in claim 11, further comprising:
analysis circuitry for determining whether said entry error is a soft error or a hard error, and for causing an entry identifier stored in the further cache location avoid storage to be invalidated if that entry identifier was stored in the further cache location avoid storage due to a soft error;
whereby, as a result of the entry identifier being invalidated, the associated entry in the replicated address storage is no longer logically excluded from the plurality of entries of the replicated address storage for the purposes of subsequent operation of the replicated address storage.

20. A data processing apparatus as claimed in claim 19, wherein:
each record of the cache location avoid storage has a source flag associated therewith;
the cache location avoid storage being arranged when allocating one of said at least one record to store a cache record identifier to set the associated source flag to a first value if the allocation is in response to the detection of said cache record error by the first error detection circuitry, and to set the associated source flag to a second value if the allocation is in response to receipt of said command from the second error detection circuitry;

if said analysis circuitry causes an invalidation of an entry identifier in the further cache location avoid storage, the analysis circuitry further causes an invalidate command to be issued to the cache location avoid storage;

the cache location avoid storage being responsive to the invalidate command to invalidate the cache record identifier for the cache record of said cache storage associated with said entry of the replicated address storage whose entry identifier has been invalidated, provided that the associated source flag has said second value.

21. A data processing apparatus as claimed in claim 1, wherein said first and second error detection circuitry perform error checking and correcting operations.

22. A data processing apparatus as claimed in claim 1, wherein if on detection of said cache record error, no record in the cache location avoid storage is available to be allocated to store the cache record identifier for the accessed cache record, an event signal is generated to identify that the allocation to the cache location avoid storage failed.

23. A data processing apparatus as claimed in claim 1, wherein the cache storage comprises data storage having a plurality of cache lines for storing data values, and address storage having a plurality of entries, each entry identifying for an associated cache line said address indication, and each cache record of the cache storage comprises an entry from the address storage and the associated cache line from the data storage.

24. A data processing apparatus as claimed in claim 23, wherein said cache record identifier identifies whether the cache record error has been detected in the entry from the address storage or the associated cache line from the data storage.

25. A data processing apparatus as claimed in claim 1, wherein:

the cache storage is an n way set associative cache, and an access performed in response to a request from the processing circuitry is performed in respect of a set in the cache having a cache record in each way of the cache storage;

said cache record identifier stored in the cache location avoid storage identifies the associated cache record by identifying a cache set and at least one cache way; and on performing an access to a specified set, the first error detection circuitry performs error detection for each cache record in the specified set other than any cache record of the specified set identified in the cache location avoid storage.

26. A data processing apparatus as claimed in claim 1, wherein the cache location avoid storage is formed as a fully associative cache.

27. A data processing apparatus as claimed in claim 1, wherein when a cache record in the cache storage needs to be selected as an allocated cache record for the storage of data values for access by the processing circuitry, any cache record whose cache record identifier is stored in the cache location avoid storage is excluded from selection as the allocated cache record.

28. A cache apparatus, comprising:

a cache storage having a plurality of cache records for storing data values, each cache record for storing one or more data values and an associated address indication for said one or more data values;

a replicated address storage having a plurality of entries, each entry having a predetermined associated cache record within the cache storage and being arranged to replicate the address indication stored in said associated cache record;

first error detection circuitry associated with said cache storage;

a cache location avoid storage having at least one record, the cache location avoid storage being associated with the first error detection circuitry;

responsive to a cache record of the cache storage being accessed, the first error detection circuitry being arranged to determine whether a cache record error exists for said accessed cache record;

on detection of said cache record error, said cache location avoid storage being arranged to cause one of said at least one record to be allocated to store a cache record identifier for the accessed cache record;

second error detection circuitry associated with said replicated address storage;

responsive to an entry of the replicated address storage being accessed, the second error detection circuitry being arranged to determine whether an entry error exists for said accessed entry;

on detection of said entry error, the second error detection circuitry preventing use of the address indication currently stored in the accessed entry, and issuing a command to said cache location avoid storage to cause one of said at least one record of said cache location avoid storage to be allocated to store the cache record identifier for the cache record of said cache storage associated with said accessed entry of the replicated address storage; and any cache record whose cache record identifier is stored in the cache location avoid storage being logically excluded from the plurality of cache records of the cache storage for the purposes of subsequent operation of the cache storage.

29. A method of handling errors in a data processing apparatus, said data processing apparatus comprising processing circuitry for performing data processing operations, a cache storage having a plurality of cache records for storing data values for access by the processing circuitry when performing said data processing operations, each cache record for storing one or more data values and an associated address indication for said one or more data values, and a replicated address storage having a plurality of entries, each entry having a predetermined associated cache record within the cache storage and being arranged to replicate the address indication stored in said associated cache record, the method comprising the steps of:

providing a cache location avoid storage having at least one record;

responsive to a cache record of the cache storage being accessed, performing a first error detection operation to determine whether a cache record error exists for said accessed cache record;

on detection of said cache record error, allocating one of said at least one record of said cache location avoid storage to store a cache record identifier for the accessed cache record;

responsive to an entry of the replicated address storage being accessed, performing a second error detection operation to determine whether an entry error exists for said accessed entry of the replicated address storage;

on detection of said entry error, preventing use of the address indication currently stored in the accessed entry of the replicated address storage, and issuing a command to said cache location avoid storage;

responsive to said command, allocating one of said at least one record of said cache location avoid storage to store the cache record identifier for the cache record of said cache storage associated with said accessed entry of the replicated address storage; and logically excluding any cache record whose cache record identifier is stored in the cache location avoid storage from the plurality of cache records of the cache storage for the purposes of subsequent operation of the cache storage.

30. A data processing apparatus, comprising:

processing means for performing data processing operations;

cache storage means having a plurality of cache record means for storing data values for access by the processing means when performing said data processing operations, each cache record means for storing one or more data values and an associated address indication for said one or more data values;

a replicated address storage means having a plurality of entry means, each entry means having a predetermined associated cache record means within the cache storage means, and each entry means for replicating the address indication stored in said associated cache record means;

first error detection means associated with said cache storage means;

a cache location avoid storage means having at least one record means, the cache location avoid storage means being associated with the first error detection means;

responsive to a cache record means of the cache storage means being accessed, the first error detection means for determining whether a cache record error exists for said accessed cache record means;

on detection of said cache record error, said cache location avoid storage means for causing one of said at least one record means to be allocated to store a cache record identifier for the accessed cache record means;

second error detection means associated with said replicated address storage means;

responsive to an entry of the replicated address storage means being accessed, the second error detection means for determining whether an entry error exists for said accessed entry means;

on detection of said entry error, the second error detection means for preventing use of the address indication currently stored in the accessed entry means, and for issuing a command to said cache location avoid storage means to cause one of said at least one record means of said cache location avoid storage means to be allocated to store the cache record identifier for the cache record means of said cache storage means associated with said accessed entry means of the replicated address storage means; and any cache record means whose cache record identifier is stored in the cache location avoid storage means being logically excluded from the plurality of cache record means of the cache storage means for the purposes of subsequent operation of the cache storage means.

* * * * *